United States Patent
Kennon et al.

(10) Patent No.: US 12,024,429 B2
(45) Date of Patent: *Jul. 2, 2024

(54) METHOD AND SYSTEM FOR CONVERTING NON-METHANE HYDROCARBONS TO RECOVER HYDROGEN GAS AND/OR METHANE GAS THEREFROM

(71) Applicant: PROTEUM ENERGY, LLC, Chandler, AZ (US)

(72) Inventors: Robert Terry Kennon, Phoenix, AZ (US); Dean C. Hoaglan, Gilbert, AZ (US); Scott V. Johnson, Scottsdale, AZ (US); Charles Robert Rapier, Chandler, AZ (US); Karen Lizeth Delfin, Chandler, AZ (US)

(73) Assignee: PROTEUM ENERGY, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/369,205

(22) Filed: Jul. 7, 2021

(65) Prior Publication Data
US 2022/0009773 A1    Jan. 13, 2022

Related U.S. Application Data

(60) Provisional application No. 63/049,022, filed on Jul. 7, 2020.

(51) Int. Cl.
*C01B 3/38* (2006.01)
*B01D 53/26* (2006.01)
(Continued)

(52) U.S. Cl.
CPC ............ *C01B 3/382* (2013.01); *B01D 53/265* (2013.01); *B01J 19/245* (2013.01); *C01B 3/26* (2013.01);
(Continued)

(58) Field of Classification Search
None
See application file for complete search history.

(56) References Cited

U.S. PATENT DOCUMENTS 3,387,942 A * 6/1968 Habermehl .............. B01J 23/80
423/437.1
3,441,393 A * 4/1969 Finneran ................. C01B 3/025
48/212
(Continued)

FOREIGN PATENT DOCUMENTS

EP       1 829 821 A1    9/2007
WO    WO-2011009565 A1 *  1/2011 ............. B01D 61/58

OTHER PUBLICATIONS

Industrial Gases Processing. Edited by Heinz-Wolfgang Häring. 2008. pp. 217-238. (Year: 2008).*

(Continued)

*Primary Examiner* — Jennifer A Leung
(74) *Attorney, Agent, or Firm* — MARSHALL, GERSTEIN & BORUN LLP

(57) ABSTRACT

The disclosure relates to methods, systems, and apparatus arranged and designed for converting non-methane hydrocarbon gases into multiple product gas streams including a predominately hydrogen gas stream and a predominately methane gas steam. Hydrocarbon gas streams are reformed, cracked, or converted into a synthesis gas stream and methane gas stream by receiving a volume of flare gas or other hydrocarbon liquid or gas feed, where the volume of hydrocarbon feed includes a volume of methane and a volume of non-methane hydrocarbons. The hydrogen contained in the syngas may be separated into a pure hydrogen gas stream. A corresponding gas conversion system can include a super heater to provide a hydrocarbon feed/steam mixture, a heavy hydrocarbon reactor for synthesis gas formation, and a hydrogen separator to recover the hydrogen (Continued)

portion of the synthesis gas. The gas conversion system can have a modal design such that it can operate to form hydrogen gas or alternatively operate to form synthetic natural gas with the same unit operation components.

24 Claims, 15 Drawing Sheets

(51) Int. Cl.
| | |
|---|---|
| *B01J 19/24* | (2006.01) |
| *C01B 3/26* | (2006.01) |
| *C01B 3/34* | (2006.01) |
| *C01B 3/50* | (2006.01) |
| *C02F 1/20* | (2023.01) |

(52) U.S. Cl.
CPC ............... *C01B 3/346* (2013.01); *C01B 3/50* (2013.01); *C02F 1/20* (2013.01); *B01J 2219/0004* (2013.01); *C01B 2203/0233* (2013.01); *C01B 2203/0277* (2013.01); *C01B 2203/0405* (2013.01); *C01B 2203/0475* (2013.01); *C01B 2203/0495* (2013.01); *C01B 2203/062* (2013.01); *C01B 2203/0866* (2013.01); *C01B 2203/0894* (2013.01); *C01B 2203/1241* (2013.01); *C01B 2203/1247* (2013.01); *C01B 2203/1276* (2013.01); *C01B 2203/1294* (2013.01); *C01B 2203/141* (2013.01); *C01B 2203/142* (2013.01); *C01B 2203/145* (2013.01); *C01B 2203/148* (2013.01)

(56) References Cited

U.S. PATENT DOCUMENTS

| | | | | |
|---|---|---|---|---|
| 3,533,766 | A | * | 10/1970 | Gignier .................... C01B 3/384 502/328 |
| 3,625,665 | A | * | 12/1971 | Thompson ............. C10G 11/00 518/712 |
| 3,726,654 | A | | 4/1973 | Baron et al. |
| 3,938,968 | A | | 2/1976 | White et al. |
| 4,861,351 | A | | 8/1989 | Nicholas et al. |
| 5,130,115 | A | | 7/1992 | Fujisou et al. |
| 2003/0223931 | A1 | | 12/2003 | Narayan |
| 2005/0244329 | A1 | | 11/2005 | Casanave et al. |
| 2007/0264186 | A1 | * | 11/2007 | Dybkjaer ................ C01B 3/384 423/437.2 |
| 2009/0013600 | A1 | | 1/2009 | Drnevich et al. |
| 2012/0078408 | A1 | * | 3/2012 | Li ........................... C01B 3/384 700/105 |
| 2012/0157731 | A1 | | 6/2012 | Grover |
| 2019/0024003 | A1 | | 1/2019 | Steill et al. |
| 2023/0002222 | A1 | | 1/2023 | Kennon et al. |

OTHER PUBLICATIONS

International Application No. PCT/US2021/040615, International Search Report and Written Opinion, dated Oct. 25, 2021.

* cited by examiner

METHOD AND SYSTEM FOR CONVERTING NON-METHANE HYDROCARBONS TO RECOVER HYDROGEN GAS AND/OR METHANE GAS THEREFROM

CROSS REFERENCE TO RELATED APPLICATION

Priority is claimed to U.S. Provisional Application No. 63/049,022 (filed Jul. 7, 2020), which is incorporated herein by reference in its entirety.

BACKGROUND OF THE DISCLOSURE

Field of the Disclosure

The disclosure relates to methods, systems, and apparatus arranged and designed for converting non-methane hydrocarbon gases and liquids into multiple product gas streams including a predominately hydrogen gas stream and a predominately methane gas steam.

Brief Description of Related Technology

Oil wells often have an amount of natural gas associated with them (also referred to herein as "associated gas" and "flare gas"). Crude oil and natural gas are extracted from the oil wells together, and the natural gas and crude oil must be separated. In remote areas with insufficient infrastructure or where the economics present a challenge, this associated gas may be flared. The flaring process causes carbon dioxide and volatile organic compound emissions and is being targeted for removal for environmental protection reasons. In addition, the flaring process wastes substantial amounts of valuable energy by unproductively burning the associated gas and is attracting increasing scrutiny for such waste.

Natural gas associated with oil wells can be high in alkanes other than methane (C1), such as ethane (C2), propane (C3) and butane (C4). These higher carbon number alkanes are of high caloric value compared to methane and can result in the associated gas having a heating value exceeding the limits for use as a conventional fuel in natural gas engines and other applications. In order to reduce the heating value of the associated gas to a range that is consistent with application specifications, the majority of the C2+ hydrocarbons are often removed producing a methane-rich gas which can be used as a conventional fuel. This gas conditioning process wherein a methane-rich gas is produced results in a by-product stream consisting predominately of the high heating value C2+ hydrocarbons which are generally referred to as natural gas liquids ("NGLs") and which are typically unusable as fuel. The by-product NGLs are generally transported off-site for further processing which adds to the cost and complexity of using associated gas as a conventional fuel.

The most common remote processing technologies for NGL separation include mechanical refrigeration units ("MRU"), Joule-Thompson Skids ("JT Skid") and membrane systems. Each of these methods separates a portion of the NGLs to provide a useable methane-rich gas, but also yields a typically unusable, high heating value NGL stream which must be collected, stored and ultimately transported off-site for processing, adding to overall costs and complexity. The alternative of converting the entire associated gas stream into a liquid fuel, referred to as gas-to-liquid ("GTL"), has so far proven to be uneconomic at the scale needed to process associated gas in the field. Both processes are energy intensive and typically require onsite electrical power generation.

Although these methods address excessive NGL content in associated gas, which often renders the gas unusable as a conventional fuel, they increase the cost and complexity of using associated gas as a fuel due to the added burden of NGL separation, storage and transportation. In cases where the associated gas is used as a conventional fuel, the engine is generally de-rated, yielding a significant loss in performance and efficiency. In addition, using associated gas as fuel can increase emissions and reduce engine life.

Methods exist for generating hydrogen from hydrocarbon streams, but scale and energy requirements have so far prevented economically viable application of such methods, especially in remote, distributed generation applications. For example, hydrogen gas can be produced using several different processes including thermochemical dissociation of hydrocarbons, electrolysis of water and anaerobic digestion of organic biomass. Hydrogen can be produced in centralized, large scale plants or in distributed, small scale facilities. There are cost tradeoffs between the two approaches with centralized production yielding a reduction in production cost but an increase in distribution cost compared to the opposite for distributed production due largely to lack of scale economies.

The least expensive and most common method for producing hydrogen is steam methane reforming ("SMR"). This process is complex and energy intensive due to the high temperatures required to dissociate the carbon and hydrogen molecules comprising methane gas and, as such, is only commercially viable in large scale, centralized facilities. Although hydrogen production and use in large integrated facilities is economically viable, the remote use of such hydrogen is too costly to compete with alternative fuel sources owing to hydrogen's high cost of storage and transportation. Water electrolysis is more suitable for distributed production but due to the high energy requirements of the process the hydrogen production cost has so far proved uneconomic.

Steill et al. U.S. Publication No. 2019/0024003 addresses these problems with methods and systems for converting associated gas in which a volume of methane and a volume of other alkanes may be cleaned of the other alkanes using a steam reformer system to create synthesis gas. The disclosed method may then further process the synthesis gas to convert it to a methane rich process gas which may be combined with flare gas to form an enriched product gas with a specific caloric value and methane number.

SUMMARY

In various aspects, the disclosure relates to a hydrocarbon (e.g., gas) conversion system for forming one or more of a hydrogen gas stream, a carbon dioxide gas stream, and a product gas stream from a hydrocarbon (e.g., gas) feed stream comprising non-methane hydrocarbons and optionally methane. As used herein, reference to a hydrocarbon gas feed stream and a gas conversion system can more generically apply to, or otherwise be used interchangeably with, a hydrocarbon feed and a hydrocarbon conversion system, respectively, for example when processing vaporized liquid hydrocarbons as components of the system feed.

In an aspect, the disclosure relates to a hydrocarbon conversion system for converting a hydrocarbon gas feed (or hydrocarbon feed) stream comprising non-methane hydrocarbons and optionally methane to form at least one of (i) a hydrogen gas stream and (ii) a product gas stream comprising methane. The hydrocarbon conversion system can be a modular system, for example comprising heavy hydrocarbon reforming (HHR) module alone or in combination with one or more other modules or unit operations such as a carbon dioxide separator or module, a synthetic natural gas (SNG) module, hydrogen separator or separator module, and/or a methane separator or separator module. Using a modular design, the HHR module is flexible in that it can provide a platform gas output with a targeted, selectable distribution between primary hydrogen and methane components using a single, consistent set of unit operations by adjusting the operating conditions thereof. The flexibility of the HHR module platform gas output allows selection of further downstream unit operation modules to provide fuel product outputs corresponding specifically to a given user's needs.

The heavy hydrocarbon reforming (HHR) module comprises: a first inlet for receiving the hydrocarbon gas feed stream; a second inlet for receiving system water (e.g., recycled from a downstream SNG module, make-up water, or fresh water for initial charge); optionally a third inlet for receiving system water (e.g., makeup or fresh water only, where the second inlet is then used for recycled downstream water only); and a first outlet for delivering a platform gas comprising methane and hydrogen (e.g., and carbon oxides, but substantially reduced water (e.g., about 2 mol. % or less). The platform gas can be the product gas when there are no further downstream modules. Alternatively, the platform gas can be an intermediate gas fed to one or more further downstream modules for separation and/or reaction. The HHR module further comprises a steam generator adapted to (i) receive system water and (ii) output steam; and a super heater (or process heater) adapted to (i) receive a feed gas comprising in admixture the hydrocarbon gas feed stream from the first inlet and the steam from the steam generator and (ii) superheat the feed gas to a predetermined temperature range to form a superheated feed gas. The HHR module further comprises a first reactor (or HHR reactor) containing a first catalyst (e.g., a catalyst fill comprising at least one catalyst, two or more catalysts, layers of different catalysts) and being adapted to receive the superheated feed gas from the super heater in fluid communication with the first reactor. The first reactor and the first catalyst are adapted to react at least a portion of the non-methane hydrocarbons in the superheated feed gas into carbon oxides, hydrogen, methane, and water, thereby forming a first reformate comprising the carbon oxides, the hydrogen, the methane, and water (e.g., a wet first reformate). In the first (HHR) reactor, typically substantially all non-methane hydrocarbons are reacted or reacted at least close to equilibrium conversion of the combined steam reformation and methanation reactions, such as at least 95, 98, 99, or 99.5 mol. % conversion of non-methane hydrocarbons present in the feed. The HHR module further comprises a cooler (or water separator/separation system more generally) adapted to (i) receive the first reformate from the first reactor in fluid communication with the cooler, and (ii) separate at least a portion of the water from the first reformate, thereby providing (i) a dried first reformate (e.g., about 2 mol. % water or) in fluid communication with the first outlet as the platform gas and (ii) a recycled system water stream in fluid communication with the steam generator (e.g., boiler component thereof) and the second inlet. The HHR module is adapted to receive additional recycled system water or water from other sources in various modular embodiments for combination with the recycled system water stream returned to the steam generator.

In a refinement of the modular system design, the HHR module is free from at least one of methane separators, hydrogen separators, carbon dioxide separators, and synthetic natural gas (SNG) reactors. In view of the modular design of the hydrocarbon conversion system, the HHR module is generally not designed to perform some or all of typical operations associated with methane separation, hydrogen separation, carbon dioxide separation, and/or SNG production, such operations generally being performed upstream or downstream of the HHR module, depending on a particular user's desired final product(s) of the hydrocarbon conversion system. The HHR module being free from such operations (e.g., free from corresponding unit operation apparatus) can be expressed as the HHR module (or hydrocarbon conversion system more generally) not containing one or more of methane separators, hydrogen separators, carbon dioxide separators, and/or SNG reactors upstream of the first outlet, downstream of the first inlet, and/or downstream of the second inlet. Even in such cases where the HHR module is free from various separators and/or SNG reactors, the HHR module can include multiple reactors for forming multiple reformate streams to increase production capacity, for example including multiple HHRs in parallel to form multiple reformate streams in parallel. Such multiple reformate streams could remain in parallel streams, consolidated into fewer streams or a single stream, etc. for subsequent cooling and water removal.

In a refinement of the modular system design, the hydrocarbon conversion system is free from further separation or reaction apparatus downstream of the HHR module first outlet; and the platform gas is the product gas stream. In some embodiments, the platform gas can be used as the final fuel product of the hydrocarbon conversion system, for example for use as a hydrogen-rich turbine fuel. In such cases, the platform gas can be used as is, or it can be blended with other fuel components (such as C1 hydrocarbons or a mixture of hydrocarbons containing primarily C1 and C2, for example pipeline methane or otherwise a predominantly methane stream), but it need not be subjected to further separation and/or reaction steps or unit operations.

In a refinement of the modular system design, the hydrocarbon conversion system further comprises a carbon dioxide separator or module in fluid communication with the first outlet of the HHR module and adapted to (i) receive the platform gas from the HHR module and (ii) separate at least a portion of carbon dioxide present in the platform gas, thereby providing (i) a carbon dioxide stream and (ii) the product gas stream comprising the methane and the hydrogen from the platform gas (e.g., with reduced or substantially no carbon dioxide therein). In some embodiments, some or substantially all of the carbon dioxide in the platform gas can be removed to provide a blue hydrogen-rich turbine fuel, which, similar to raw platform gas above, can be blended with other fuel components such as C1 hydrocarbons or a mixture of hydrocarbons containing primarily C1 and C2, for example pipeline methane or otherwise a predominantly methane stream. In some embodiments, the hydrocarbon conversion system can incorporate a carbon dioxide separator module including the carbon dioxide separator along with an integrated recuperative heating element, for example to heat the amine in an amine separator or other process fluid in the carbon dioxide separator using process heat from one or more other modules. For example, a hot-oil heating system can be heated by the SNG reactor outlet and/or steam from the vaporizer to thereby provide heat to the carbon dioxide separator.

In a refinement of the modular system design, the hydrocarbon conversion system further comprises a synthetic natural gas (SNG) module. In an embodiment, the SNG module comprises: a first inlet for receiving an SNG feed stream comprising hydrogen, carbon oxides, and optionally methane (e.g., substantially reduced or limited water in the feed), the first inlet of the SNG module being in fluid communication with the first outlet of the HHR module (e.g., downstream thereof to (directly) receive the platform gas therefrom as the feed to the SNG module); a first outlet for delivering the product gas stream comprising the methane (e.g., at a higher methane content than that of the SNG feed stream); and a second outlet for delivering the recycled system water, the second outlet of the SNG module being in fluid communication with the second inlet of the HHR module (e.g., upstream thereof to provide additional water to the recycled water stream in the HHR module). The SNG module further comprises a heater adapted to (i) receive the SNG feed stream and (ii) heat the SNG feed stream to a predetermined temperature range to form a heated SNG feed gas. The heater can be in the form of a recuperative heat exchanger using the hot SNG product stream as a hot heat exchange fluid to preheat the SNG feed stream prior to feeding the SNG product stream to the cooler. The SNG module further comprises a second reactor (SNG) containing a second catalyst (e.g., a catalyst fill comprising at least one catalyst, two or more catalysts, layers of different catalysts) and being adapted to receive the heated SNG feed gas from the heater in fluid communication with the second reactor. The second reactor and the second catalyst are adapted to react at least a portion of the carbon oxides and the hydrogen in the heated SNG feed gas into converted methane and water, thereby forming a wet synthetic natural gas comprising the converted methane and the water, wherein the synthetic natural wet processed gas has an overall higher methane mole fraction than the SNG feed stream. The SNG module further comprises a cooler adapted to (i) receive the wet synthetic natural gas from the second reactor in fluid communication with the cooler, and (ii) separate at least a portion of the water from the wet synthetic natural gas, thereby providing (i) a dried synthetic natural gas in fluid communication with the first outlet as the product gas and (ii) a recycled system water stream in fluid communication with the second outlet (e.g., such that the SNG module is adapted to deliver additional recycled system water to the HHR module for combination with the recycled water stream therein returned to the steam generator and/or vaporizer (if present)). The cooler in the SNG module can include a dehydrator or dryer for more complete water removal in the dried synthetic natural gas.

In some embodiments, the HHR module's fluid communication with the SNG module can be directly or immediately downstream of the HHR module, for example without any other intervening separator operations therebetween. This can be the case, for example, when methane is the primary desired product of the overall hydrocarbon conversion system. In such cases, the HHR module can be operated at relatively lower temperatures to provide a platform gas with a relatively higher fraction of methane, for example relative to the platform gas as a whole or relative to the combined amount of methane and hydrogen in the platform gas.

In other embodiments, the HHR module's fluid communication with the SNG module can be indirectly downstream of the HHR module, for example having at least one other intervening separator operation therebetween (e.g., a carbon dioxide separator and a hydrogen separator in series between the HHR module and the SNG module). This can be the case, for example, when hydrogen is the primary product of the overall hydrocarbon conversion system. In such cases, the HHR module can be operated at relatively higher temperatures to provide a platform gas with a relatively higher fraction of hydrogen, for example relative to the platform gas as a whole or relative to the combined amount of methane and hydrogen in the platform gas. Substantially pure hydrogen can be removed from the platform gas upstream of the SNG module, and residual unseparated hydrogen along with the carbon oxides from the platform gas can be converted to methane as a secondary product in the SNG module.

In a refinement of the modular system design, the hydrocarbon conversion system further comprises a carbon dioxide separator or module and a hydrogen separator module in series to provide (i) a hydrogen gas stream and (i) a compressed tail gas as the product stream. The carbon dioxide separator is in fluid communication with the first outlet of the HHR module and adapted to (i) receive the platform gas from the HHR module and (ii) separate at least a portion of carbon dioxide present in the platform gas, thereby providing (i) a carbon dioxide stream and (ii) an intermediate product gas stream comprising the methane, the hydrogen, and unseparated carbon oxides from the platform gas. The hydrogen separator module comprises: a first inlet for receiving the intermediate product gas stream from and in fluid communication with the carbon dioxide separator (e.g., downstream thereof); a first outlet for delivering the hydrogen gas stream; and a second outlet for delivering a compressed tail gas comprising hydrogen (e.g., at a lower level than that of the intermediate product gas), carbon oxides, and methane (e.g., substantially no water); a hydrogen separator adapted to (i) receive the intermediate product gas and (ii) separate at least a portion of the hydrogen from the intermediate product gas, thereby providing (i) the hydrogen gas stream and (ii) a tail gas comprising hydrogen, carbon oxides, and methane (e.g., substantially no water); and a compressor adapted to receive and compress the tail gas, thereby providing the compressed tail gas as the product gas. In this case, the tail gas can be used as a designer fuel, with a composition tailored to a specific application need. A portion of the carbon dioxide stream from the upstream carbon dioxide separator could still be used to meter in carbon dioxide to provide targeted compositions as measured by fuel parameters including Wobbe Index, Methane Number, etc. The tail gas similarly could be blended with other external gases like pipeline methane, synthetic natural gas from an SNG module, etc. to provide a designer fuel with a desired target composition.

In a refinement of the modular system design, the hydrocarbon conversion system further comprises a carbon dioxide separator or module, a hydrogen separator module, and an SNG module in series to provide (i) a hydrogen gas stream and (i) a synthetic natural gas as the product stream. The carbon dioxide separator is in fluid communication with the first outlet of the HHR module and adapted to (i) receive the platform gas from the HHR module and (ii) separate at least a portion of carbon dioxide present in the platform gas, thereby providing (i) a carbon dioxide stream and (ii) an intermediate product gas stream comprising the methane, the hydrogen, and unseparated carbon oxides from the platform gas. The hydrogen separator module comprises: a first inlet for receiving the intermediate product gas stream from and in fluid communication with the carbon dioxide separator (e.g., downstream thereof); a first outlet for delivering the hydrogen gas stream; and a second outlet for delivering a compressed tail gas comprising hydrogen (e.g., at a lower level than that of the intermediate product gas), carbon oxides, and methane (e.g., substantially no water); a hydrogen separator adapted to (i) receive the intermediate product gas and (ii) separate at least a portion of the hydrogen from the intermediate product gas, thereby providing (i) the hydrogen gas stream and (ii) a tail gas comprising hydrogen, carbon oxides, and methane (e.g., substantially no water); and a compressor adapted to receive and compress the tail gas. The SNG module comprises a first inlet for receiving an SNG feed stream comprising hydrogen, carbon oxides, and optionally methane (e.g., substantially no water in the feed), the first inlet of the SNG module being in fluid communication with the second outlet of the hydrogen separator module (e.g., downstream thereof); a first outlet for delivering the product gas stream comprising the methane (e.g., at a higher methane content than that of the SNG feed stream); a second outlet for delivering the recycled system water, the second outlet of the SNG module being in fluid communication with the second inlet of the HHR module (e.g., upstream thereof to provide additional water to the recycled water stream in the HHR module). The SNG module further comprises a heater adapted to (i) receive the SNG feed stream and (ii) heat the SNG feed stream to a predetermined temperature range to form a heated SNG feed gas. The SNG module further comprises second reactor (SNG) containing a second catalyst and being adapted to receive the heated SNG feed gas from the heater in fluid communication with the second reactor, wherein the second reactor and the second catalyst are adapted to react at least a portion of the carbon oxides and the hydrogen in the heated SNG feed gas into converted methane and water, thereby forming a wet synthetic natural gas comprising the converted methane and the water, wherein the wet synthetic natural gas has an overall higher methane mole fraction than the SNG feed stream. The SNG module further comprises a cooler adapted to (i) receive the synthetic natural wet processed gas from the second reactor in fluid communication with the cooler, and (ii) separate at least a portion of the water from the wet synthetic natural gas, thereby providing (i) a dried synthetic natural gas (e.g., predominantly methane, optionally with minor amounts of unreacted hydrogen and/or carbon oxides) in fluid communication with the first outlet as the product gas and (ii) a recycled system water stream in fluid communication with the second outlet. In some embodiments, a portion of the carbon dioxide stream (or trim stream) from the upstream carbon dioxide separator could be fed to the SNG feed line in an amount sufficient to react essentially all of the hydrogen in the tail gas (i.e., accounting for carbon monoxide and carbon dioxide already present in the tail gas). Such trim carbon dioxide is generally prior to tail gas compression.

In another aspect, the disclosure relates to a hydrocarbon or gas conversion system for forming (i) a hydrogen gas stream and (ii) a product gas stream from a hydrocarbon gas feed stream comprising non-methane hydrocarbons and optionally methane. The gas conversion system comprises: a super heater adapted to (i) receive a feed gas comprising the hydrocarbon gas feed stream and water (e.g., water vapor/steam) in admixture and (ii) superheat the feed gas to a predetermined temperature range to form a superheated feed gas; a first reactor containing a first catalyst and being adapted to receive the superheated feed gas from the super heater in fluid communication with the first reactor, wherein the first reactor and the first catalyst are adapted to react (e.g., via selective cracking, steam reformation) at least a portion of non-methane hydrocarbons in the superheated feed gas into carbon oxides and hydrogen, thereby forming a first reformate (e.g., a wet reformate; reactor product outlet) comprising the carbon oxides, the hydrogen, optionally methane, and optionally water; and a hydrogen separator (e.g., membrane separator, PSA separator) adapted to (i) receive the first reformate from the first reactor in fluid communication with the hydrogen separator, and (ii) separate at least a portion of the hydrogen from the reformate, thereby providing (i) the hydrogen gas stream comprising the separated hydrogen, and, separately, (ii) the product gas stream comprising the carbon oxides. The first reactor can be a heavy hydrocarbon reactor (HHR), for example a first HHR when two or more HHR units are included in the system (e.g., in parallel). The product gas stream can further include any unseparated hydrogen as well as any methane or unreacted non-methane hydrocarbons present in the reformate.

In another aspect, the disclosure relates to a hydrocarbon or gas conversion system for forming (i) optionally a hydrogen gas stream and (ii) a product gas stream from a hydrocarbon gas feed stream comprising non-methane hydrocarbons and optionally methane. In this aspect, the gas conversion system has a modal design such that it can operate to form hydrogen gas (e.g., HHR/HHR mode) or alternatively operate to form synthetic natural gas (e.g., HHR/SNG mode). In the HHR/HHR mode, two reactors in parallel operate as heavy hydrocarbon reactors (HHRs). In the HHR/SNG mode, two reactors in series operate as a heavy hydrocarbon reactor (HHR) followed by a synthetic natural gas (SNG) reactor. The gas conversion system comprises: a super heater adapted to (i) receive a feed gas comprising the hydrocarbon gas feed stream and water in admixture and (ii) superheat the feed gas to a predetermined temperature range to form a superheated feed gas; a first reactor (e.g., a first HHR) containing a first catalyst and being adapted to receive the superheated feed gas from the super heater in fluid communication with the first reactor, wherein the first reactor and the first catalyst are adapted to react (e.g., via selective cracking, steam reformation) at least a portion of non-methane hydrocarbons in the superheated feed gas into carbon oxides and hydrogen, thereby forming a first reformate (e.g., a wet reformate; reactor product outlet) comprising the carbon oxides, the hydrogen, and optionally methane; and a second reactor (e.g., a second heavy hydrocarbon reactor or a first syngas reactor) containing a second catalyst (e.g., same as the first catalyst) and being adapted to operate in a first mode as a heavy hydrocarbon reactor or in a second mode as a syngas reactor (e.g., in one of two alternative operational modes). In the first mode (HHR), the second reactor is adapted to receive the superheated feed gas from the super heater in fluid communication with the second reactor, wherein the second reactor and the second catalyst are adapted to react (e.g., via selective cracking, steam reformation) at least a portion of non-methane hydrocarbons in the superheated feed gas into carbon oxides and hydrogen, thereby forming a second reformate (e.g., a wet reformate; reactor product outlet) comprising the carbon oxides, the hydrogen, and optionally methane. In the second mode (SNG), the second reactor is adapted to receive the first reformate from the first reactor (e.g., after cooling and water separation) in fluid communication with the second reactor, wherein the second reactor and the second catalyst are adapted to convert at least a portion of the carbon oxides and the hydrogen in the first reformate into converted methane, thereby forming a synthetic natural wet processed gas comprising the converted methane, wherein the synthetic natural wet processed gas has an overall higher methane mole fraction than the hydrocarbon gas feed stream. For example, methane can be present in the synthetic natural wet processed gas based on the combination of methane originally present in the hydrocarbon gas feed stream, methane formed in the first reactor via methanation/reverse reaction of an equilibrium steam reformation reaction, and/or methane formed in the second reactor via syngas conversion.

The modal gas conversion system further comprises a first flow splitter adapted to receive the superheated feed gas from the super heater in fluid communication with the first flow splitter, wherein (i) in the first mode (HHR) of the second reactor, the first flow splitter is adapted to feed at least a portion of the superheated feed gas to both of the first reactor and the second reactor in parallel such that each is in fluid communication with and adapted to receive a portion of the superheated feed gas, and (ii) in the second mode (SNG) of the second reactor, the first flow splitter is adapted to (A) feed at least a portion of the superheated feed gas to the first reactor and (B) prevent flow of the superheated feed gas to the second reactor (e.g., no flow split and superheated feed gas is fed only to the first reactor).

The modal gas conversion system further comprises a first flow mixer in fluid communication with the first reactor and the second reactor (e.g., at outlets of each), wherein (i) in the first mode (HHR) of the second reactor, the first flow mixer is adapted to receive and combine the first reformate and the second reformate into a single reformate (e.g., where the first reformate and the second reformate can be combined into a single reformate and fed to a hydrogen separator when present), and (ii) in the second mode (SNG) of the second reactor, the first flow mixer is adapted to receive only the first reformate (e.g., no outlet or other flow from the second reactor enters the first flow mixer or otherwise combines with the first reformate).

The modal gas conversion system further comprises a second flow splitter in fluid communication with the first flow mixer, wherein (i) in the first mode (HHR) of the second reactor, the second flow splitter is adapted to (A) receive the combined first reformate and second reformate and (B) prevent flow of the combined first reformate and second reformate to the second reactor (e.g., sending the combined reformate to a cooler for water separation and then a hydrogen separator), and (ii) in the second mode (SNG) of the second reactor, the second flow splitter is adapted to (A) receive only the first reformate and (B) feed at least a portion of the first reformate to the second reactor (e.g., sending the single reformate to the second reactor in series for methane production, bypassing any downstream hydrogen separator).

In an embodiment, the modal gas conversion system further comprises a hydrogen separator, wherein, in the first mode (HHR) of the second reactor, the hydrogen separator is adapted to (i) receive the combined first reformate and second reformate from the second flow splitter in fluid communication with the hydrogen separator, and (ii) separate at least a portion of the hydrogen from the combined first reformate and second reformate, thereby providing (i) the hydrogen gas stream comprising the separated hydrogen, and, separately, (ii) the product gas stream comprising the carbon oxides.

The hydrocarbon gas feed stream in any aspect includes non-methane hydrocarbons and optionally methane. Namely, in some embodiments, the hydrocarbon gas feed can include methane. In other embodiments, the hydrocarbon gas feed can exclude or otherwise be substantially free from methane. For example, in some embodiments, methane is present in a flare gas/associated gas stream that can be used as a feed to the disclosed system, but such methane is an optional component of the hydrocarbon gas feed stream in the event of an upstream Joule-Thompson (JT) or other NGL separation. In other embodiments, methane can be absent from the hydrocarbon gas feed stream when a feedstock other than a flare gas/associated gas stream is used (e.g., a propane or other feed gas). The hydrocarbon feed stream may be liquid, or gas formed by vaporizing liquid.

The reformate stream(s) in any aspect similarly include methane as an optional component, in addition to its carbon oxide and hydrogen components. The methane can be present in the reformate based on methane present in the hydrocarbon gas feed stream, methane formed in the first reactor via methanation/reverse reaction of an equilibrium steam reformation reaction, and/or methane formed in the second reactor via syngas conversion (e.g., when the second reactor is operating as an SNG reactor, such as in an HHR/SNG operational mode).

The dry reformate or platform gas in any aspect includes predominantly methane and hydrogen, along with substantial amounts of carbon dioxide and typically at least some carbon monoxide and/or water. In various embodiments, the specific composition of the reformate or platform gas can be selected and controlled to be within relatively broad ranges by varying steam:carbon ratio and reaction temperature in the first reactor of the HHR module. For example, the methane content of the platform gas can be in a range of 10-80 mol. %, for example at least 10, 20, 30, 40, 50, or 60 mol. % and/or up to 30, 40, 50, 60, 70, or 80 mol. %. The hydrogen content of the platform gas can be in a range of 10-70 mol. %, for example at least 10, 20, 30, 40, or 50 mol. % and/or up to 30, 40, 50, 60, or 70 mol. %. The carbon dioxide content of the platform gas can be in a range of 5-30 mol. %, for example at least 5, 8, 10, or 12 mol. % and/or up to 12, 16, 20, 24, or 30 mol. %. The carbon monoxide content of the platform gas can be in a range of 0.01-10 mol. %, for example at least 0.01, 0.1, 0.2, or 0.5 mol. % and/or up to 1, 2, 3, 5, 7, or 10 mol. %. The water content of the platform gas can be in a range of 0.01-5 mol. %, for example at least 0.01, 0.1, 0.2, or 0.5 mol. % and/or up to 0.5, 1, 2, 3, or 5 mol. %.

In cases where the HHR module is operated to favor hydrogen as a desired or targeted product, the hydrogen content of the platform gas can be in a range of 30-70 mol. %, for example at least 30, 35, 40, 45, or 50 mol. % and/or up to 50, 55, 60, 65, or 70 mol. %. Similarly, the methane content of the platform gas can be in a range of 10-50 mol. %, for example at least 10, 15, 20, 25, or 30 mol. % and/or up to 30, 35, 40, 45, or 50 mol. %. Similarly, the carbon dioxide content of the platform gas can be in a range of 5-30 mol. %, for example at least 5, 8, 10, or 12 mol. % and/or up to 12, 16, 20, 24, or 30 mol. %. Similarly, the carbon monoxide content of the platform gas can be in a range of 0.1-10 mol. %, for example at least 0.1, 0.2, or 0.5 mol. % and/or up to 1, 2, 3, 5, 7, or 10 mol. %. Similarly, the water content of the platform gas can be in a range of 0.01-5 mol. %, for example at least 0.01, 0.1, 0.2, or 0.5 mol. % and/or up to 0.5, 1, 2, 3, or 5 mol. %.

In cases where the HHR module is operated to favor methane as a desired or targeted product, the methane content of the platform gas can be in a range of 50-80 mol. %, for example at least 50, 55, 60, 65, or 70 mol. % and/or up to 60, 65, 70, 75, or 80 mol. %. Similarly, the hydrogen content of the platform gas can be in a range of 10-40 mol.

%, for example at least 10, 15, 20, or 25 mol. % and/or up to 20, 25, 30, 35, or 40 mol. %. Similarly, the carbon dioxide content of the platform gas can be in a range of 5-30 mol. %, for example at least 5, 8, 10, or 12 mol. % and/or up to 12, 16, 20, 24, or 30 mol. %. Similarly, the carbon monoxide content of the platform gas can be in a range of 0.01-3 mol. %, for example at least 0.01, 0.1, 0.2, or 0.5 mol. % and/or up to 1, 2, or 3 mol. %. Similarly, the water content of the platform gas can be in a range of 0.01-5 mol. %, for example at least 0.01, 0.1, 0.2, or 0.5 mol. % and/or up to 0.5, 1, 2, 3, or 5 mol. %.

The synthetic natural gas in any aspect includes predominantly methane, possibly along with minor amounts of unreacted carbon oxides and/or hydrogen, and typically at least some water. For example, wet synthetic natural gas can include methane in an amount of about 70-90 mol. %, for example at least 70, 75, or 80 mol. % and/or up to 80, 85, or 90 mol. %. Similarly, the wet synthetic natural gas can include water in an amount of about 10-25 mol. %, for example at least 10, 12, or 15 mol. % and/or up to 15, 20, or 25 mol. %. Similarly, the wet synthetic natural gas can include a combined amount of carbon oxides and/or hydrogen in an amount of about 0.1-5 mol. %, for example at least 0.1, 0.2, 0.5, or 1 mol. % and/or up to 1, 2, 3, or 5 mol. %. After water removal, dried synthetic natural gas can include methane in an amount of about 92-99 mol. %, for example at least 92, 94, 96, or 98 mol. % and/or up to 95, 97, 98, or 99 mol. %. Similarly, the dried synthetic natural gas can include water in an amount of 0.01-5 mol. %, for example at least 0.01, 0.1, 0.2, or 0.5 mol. % and/or up to 0.5, 1, 2, 3, or 5 mol. %. Similarly, the dried synthetic natural gas can include a combined amount of carbon oxides and/or hydrogen in an amount of about 0.1-5 mol. %, for example at least 0.1, 0.2, 0.5, or 1 mol. % and/or up to 0.5, 1, 2, 3, or 5 mol. %.

In an alternative embodiment, the hydrocarbon or gas conversion system can omit the super heater or incorporate the super heater into a reactor unit operation. For example, the super heater can be incorporated into the first and/or second reactor such that the reactors are adapted to receive water in addition to the hydrocarbon gas feed stream, and then super heat the two components in admixture to form the superheated feed gas in the reactors. Alternatively, the input to the hydrocarbon or gas conversion system can already be in the form of a superheated feed gas including the hydrocarbon gas feed and water from some other source, which superheated feed gas can then be fed to the reactor(s).

Various refinements of the disclosed hydrocarbon or gas conversion systems, components thereof, and modules thereof are possible.

In a refinement, the hydrocarbon or gas conversion system further comprises: a steam generator adapted to (i) receive system water and (ii) output steam; and/or a mixer (e.g., mixing valve system) in fluid communication with an inlet for receiving the hydrocarbon gas feed stream and in fluid communication with the steam generator for receiving the output steam, the mixer being adapted to (i) flow control at least a portion of the hydrocarbon gas feed stream and the steam, and (ii) output the feed gas to the super heater in fluid communication with the mixer. System water can include recycled system water and/or water supplied from a tank/reservoir system component in fluid communication with the steam generator.

As described above, the specific composition of the reformate or platform gas can be selected and controlled to be within relatively broad ranges by varying steam:carbon ratio and reaction temperature in the first reactor of the HHR module. Steam is generally admixed with the hydrocarbon gas feed such that the steam:carbon ratio in the resulting feed gas (and superheated feed gas) is in a range of 2 to 4, 5, 6, or higher. For example, the steam:carbon ratio can have a value of about 2.3 to promote methane production, such as at least 2.0, 2.1, or 2.2 and/or up to 2.4, 2.5, or 2.6. Alternatively, the steam:carbon ratio can have a value of about 4 or higher to promote hydrogen production, such as at least 3, 3.5, 4, 4.5, 5, 6 and/or up to 4, 4.5, 5, 6, 7, or 8. The steam:carbon ratio is a molar ratio between the moles of water and moles of carbon atoms in the feed gas (e.g., 1 mol of ethane in the feed gas provides 2 mol of carbon atoms for determination of the steam:carbon ratio). The first reactor of the HHR module can operate over a wide range of temperatures, for example in a range of about 400-800° C. For example, the first reactor can have an inlet temperature (or superheated feed gas temperature) in a range of about 400-550° C. to promote methane production, such as at least 400, 425, or 450° C. and/or up to 450, 475, 500, 525, or 550° C. inlet temperature, optionally with little or substantially no temperature increase or decrease at the outlet (e.g., within 25 or 50° C. of inlet). Alternatively, the first reactor can have an inlet temperature (or superheated feed gas temperature) in a range of about 450-700° C. to promote hydrogen production, such as at least 400, 425, or 450° C. and/or up to 450, 475, 500, 525, or 550° C. inlet temperature, further including a temperature increase at the outlet (e.g., at least 50, 75, 100, or 125° C. and/or up to 100, 150, 200, or 250° C. increase relative to inlet).

In a refinement, the first reformate exiting the first reactor further comprises water; and the system further comprises a cooler adapted to (i) receive the first reformate from the first reactor in fluid communication with the cooler, and (ii) separate at least a portion of the water from the first reformate (e.g., via cooling/condensation), thereby providing a dried first reformate in fluid communication with and fed to the hydrogen separator. Similar conditions apply to the second reactor when operating in an HHR mode, in an SNG mode, or in an SNG module. The initial (wet) reformate streams exiting the reactors generally contain 40 to 80 mol. % (or vol.%) water, for example at least 40, 45, 50, 55, or 60 mol. % and/or up to 60, 65, 70, 75, or 80 mol. % water. The cooler typically removes at least 85% of the water in the initial reformate, for example removing at least 85, 90, 95, 98, or 99% of the water. The dried reformate streams exiting the cooler or other water separator system generally contain up to 20 mol. % (or vol.%) water, for example at least 0.1, 0.2, 0.5, 1, 2, or 5 mol. % and/or up to 1, 2, 3, 5, 7, 10, 15, or 20 mol. % water.

In various embodiments of the cooler, for example in the HHR module, and/or the hydrocarbon or gas conversion system more generally, the cooler can comprise: (i) a chiller in fluid communication with and adapted to reduce the temperature of the first reformate from the first reactor (e.g., downstream of the recuperative heat exchanger(s)), thereby condensing water from the first reformate; (ii) a water separator in fluid communication with the chiller and adapted to remove the condensed water from the first reformate, thereby forming the platform gas and the reformate water stream as outlets to the water separator; and (iii) a de-aerator in fluid communication with the reformate water stream from the water separator and adapted to remove entrained reformate gas (e.g., carbon oxides, hydrogen, and/or methane) therefrom, thereby forming the recycled water stream. In some embodiments, the cooler can include a further water separator unit upstream of the chiller (e.g., and downstream of the recuperative heat exchanger(s)), for example to remove a small portion of water that has condensed as a result of heat exchange and cooling of the reformate in the recuperative heat exchangers. The cooler typically does not need to include a dehydrator or other absorbent material for essentially complete water removal; the minor amount of about 2 mol. % water or less remaining after cooling and condensation is acceptable for downstream processing, such as in an SNG module.

In a refinement, the hydrocarbon or gas conversion system further comprises: a first heat exchanger positioned between (e.g., in a fluid flow sense) the steam generator and the super heater, the first heat exchanger being adapted to receive the feed gas from the steam generator (e.g., via the mixer) as a first cold heat exchange fluid and the first reformate as a first hot heat exchange fluid, thereby heating the feed gas delivered to the super heater (e.g., and cooling the first reformate); a second heat exchanger positioned between the first inlet and the steam generator (or mixer), the second heat exchanger being adapted to receive the hydrocarbon gas feed stream from the first inlet as a second cold heat exchange fluid and the first reformate as a second hot heat exchange fluid (e.g., delivered from/in fluid communication with the first heat exchanger hot side), thereby heating the hydrocarbon gas feed stream to be mixed with the steam to provide the feed gas (e.g., and further cooling the first reformate); and/or a third heat exchanger positioned between the cooler and the steam generator, the third heat exchanger being adapted to receive the recycled system water stream from the cooler and the second inlet as a third cold heat exchange fluid and the first reformate as a third hot heat exchange fluid (e.g., delivered from/in fluid communication with the second heat exchanger hot side), thereby heating the recycled system water stream delivered to the steam generator (e.g., boiler component thereof) and (further) cooling the first reformate delivered to the cooler. The hydrocarbon conversion system preferably includes all three of the first, second, and third heat exchangers as HHR recuperative heat exchangers to recover heat energy from the HHR/first reactor outlet. In various embodiments, however, the hydrocarbon conversion system can include any combination of some, all, or none of the first, second, and third heat exchangers.

In a further refinement, the hydrocarbon or gas conversion system further comprises a vaporizer heat exchanger positioned between the first reactor and the first heat exchanger, the vaporizer heat exchanger being adapted to receive at least a portion of the system water as the vaporizer cold heat exchange fluid and the first reformate as the vaporizer hot heat exchange fluid, thereby heating and vaporizing the portion of the system water delivered as steam to the steam generator (e.g., steam drum reservoir thereof) or downstream thereof. The portion of the system water fed to the vaporizer can include fresh/makeup water and/or recycled system water from the cooler. The vaporizer can be positioned downstream of the third heat exchanger and can include a flow-split between a return to the steam generator and the vaporizer heat exchanger. The hydrocarbon or gas conversion system can further comprise: a flow splitter adapted to (i) receive the system water (e.g., recycled system water and/or makeup water from the third heat exchanger in fluid communication with the flow splitter), (ii) deliver at least a portion of the system water to the steam generator, and (iii) deliver at least a portion of the system water to the vaporizer heat exchanger. The flow splitter can deliver selected, variable relative amounts of the system water to the steam generator boiler and the vaporizer. In limiting cases, the flow splitter also can deliver system water only to the steam generator or only to the vaporizer.

In another refinement, the hydrocarbon or gas conversion system further comprises a vaporizer heat exchanger positioned between the first reactor and the cooler, the vaporizer heat exchanger being adapted to receive at least a portion of the system water (e.g., recycled system water from the cooler) as the vaporizer cold heat exchange fluid and the first reformate at the vaporizer hot heat exchange fluid, thereby heating and vaporizing the portion of the system water delivered as steam to the steam generator (e.g., steam drum reservoir thereof) or downstream thereof.

In another refinement, the hydrocarbon or gas conversion system further comprises a flow splitter adapted to (i) receive the system water (e.g., recycled water stream from the cooler such as downstream of the third heat exchanger and in fluid communication with the flow splitter), (ii) deliver at least a portion of the system water to a boiler portion of the steam generator, and (iii) deliver at least a portion of the system water to a steam reservoir portion of the steam generator (e.g., as steam via an intervening vaporizer when present). This embodiment also can represent an upgradable version of the HHR module that does not contain the vaporizer, but which is pre-plumbed with the water lines to facilitate later installation and connection of the vaporizer to the water lines as the cold side fluid.

The vaporizer provides the benefit that the first reformate is cooled to a relatively lower temperature such that subsequent downstream unit operations in the HHR module or the hydrocarbon or gas conversion system more generally, for example the first, second, and third heat exchangers, are not exposed to high extreme temperatures, thus lessening their cost while still providing the recuperative energy benefits of preheating the water, hydrocarbon feed, and feed gas streams. Such high first reformate temperatures immediately out of the first reactor are possible when the first reactor is operated to favor hydrogen gas as a product component in the platform gas. The vaporizer also provides steam output for various process uses, for example as a reactant for the first reactor, and the steam demand for the first reactor is typically higher when the first reactor is operated to favor hydrogen gas as a product in the platform gas (i.e., which also corresponds to the higher first (HHR) reactor outlet temperature and need for temperature reduction). Vaporizer steam output can be used in other process elements, for example in the carbon dioxide separator (e.g., amine separator). In embodiments when the first reactor is operated to favor methane as a product in the platform gas, the first reformate temperatures immediately out of the first reactor are typically lower in comparison as is the steam demand for the first reactor. In such cases, a relatively smaller fraction (or none) of the system water can be delivered to the vaporizer heat exchanger, with the balance being delivered to the steam generator (e.g., boiler thereof). Thus, the vaporizer facilitates the modular design of the HHR module and its ability to operate in both high- and low-temperature regimes to make platform gas products favoring either hydrogen or methane components: Selection of a variable partition between system water fed back to the steam generator boiler vs. that fed to the vaporizer allows a variable, selectable degree of temperature reduction for the wet reformate and steam generation that is appropriate for the hydrogen or methane favored platform gas component. In other embodiments, further or alternative temperature control means can be used to reduce or limit incoming high reformate temperatures into the heat exchangers.

In a refinement, the hydrocarbon or gas conversion system further comprises: a second reactor (e.g., a (second) heavy hydrocarbon reactor) containing a second catalyst and being adapted to receive the superheated feed gas from the super heater in fluid communication with the second reactor, wherein the second reactor and the second catalyst are adapted to react (e.g., via selective cracking, steam reformation) at least a portion of non-methane hydrocarbons in the superheated feed gas into carbon oxides and hydrogen, thereby forming a second reformate (e.g., a wet reformate; reactor product outlet) comprising the carbon oxides, the hydrogen, and optionally methane. The first reactor and the second reactor are in parallel such that each is in fluid communication with and adapted to receive a portion of the superheated feed gas (e.g., via a suitable flow splitter upstream of the reactors and downstream of the super heater). The first reformate and the second reformate are combined into a single reformate in fluid communication with and fed to the hydrogen separator (e.g., via a suitable mixer downstream of the reactors and upstream of the hydrogen separator and the cooler (when present)).

In a refinement, the first reactor (e.g., and second reactor if present) is adapted to operate as an adiabatic reactor, an isothermal reactor, a temperature increase-controlled reactor, and/or a temperature decrease-controlled reactor. Isothermal operation of a reactor can include relatively small temperature gradients between inlet and outlet reactant/product streams, for example having a temperature difference or absolute temperature difference ($\Delta T$ or $|\Delta T|$) up to about 25, 50, 75, or 100° C. Temperature increase-/decrease-controlled operation of a reactor can include a moderate temperature increase or decrease from inlet to outlet for reactant/product streams, respectively, for example having a temperature difference ($\Delta T$, outlet minus inlet) of at least 75, 100, 125, or 150° C. and/or up to about 125, 150, 175, 200, 250, or 300° C. for a controlled temperature increase, or at least −125, −150, −175, −200, −250, or −300° C. and/or up to −75, −100, −125, or −150° C. for a controlled temperature decrease.

In a refinement, the first reactor (e.g., and second reactor if present) is adapted to receive a countercurrent, (hot) heat exchange fluid, thereby providing heat to a reaction volume in the first reactor containing the first catalyst and the superheated feed gas. More generally, the reactors are adapted to independently receive either a countercurrent or cocurrent heat exchange fluid, depending on whether the given reactor is configured to operate as an isothermal or adiabatic reactor for an endothermic or exothermic reaction Depending upon application needs, each reactor can be independently selected to operate in adiabatic or isothermal mode, and each reactor can be independently selected to have counter current or co-current heat exchange streams. For example, one or both of the reactors are operating in an HHR mode for hydrogen gas generation as an eventual product, the reactors are suitably operated as isothermal reactors or temperature increase-/decrease-controlled reactors. More specifically, for hydrogen production the HHR(s) can be operated isothermally or with controlled temperature increase or decrease by utilizing counter-current flow heat exchange streams for heating the reactor at both ends. The initial feed is preheated using the superheater and counter flow with heating fluid (hot gas) is used to introduce heat at the exit and prevent temperature drop across the reactor catalyst bed from entrance to exit. When one reactor is operating in an HHR mode and another reactor is operating in SNG mode in a modal system design for methane gas generation as an eventual product, the HHR reactor can be operated adiabatically using parallel/co-current heating fluid flow. The SNG reactor operates more as isothermal to maintain the reaction temperature within a reasonable range by using counter flow—in this case with a cooling fluid (e.g., ambient air from blowers)—to cool the reactor given that methanation is an exothermic reaction. Heat can be used to limit SNG reaction (e.g., alternate method of controlling catalyst temperature).

In a refinement, the hydrocarbon or gas conversion system further comprises: a methane separator adapted to (i) receive a hydrocarbon gas pre-feed stream comprising non-methane hydrocarbons and methane (e.g., as a flare gas/associated gas stream) and (ii) separate at least a portion of the methane from the pre-feed stream, thereby providing the hydrocarbon gas feed stream comprising the non-methane hydrocarbons (e.g., in addition to potentially residual amounts of unseparated methane) as a feed to the super heater (e.g., via the mixer/steam generator upstream thereof), for example after NGL liquid vaporization in a vaporizer. The methane separator (or NGL separator) can be any suitable separator to separate methane from other natural gas liquids (NGLs) from a flare gas/associated gas stream including both methane and non-methane hydrocarbons. Suitable examples include Joule-Thompson (JT) separators, mechanical refrigeration separators, membrane separators, etc. and can generally include separators known in the art.

Prior to being fed to the methane separator, the hydrocarbon conversion system, or the HHR module, the flare gas/associated gas stream can be first split into (i) a bypass/enrichment stream for blending with the product gas stream (i.e., bypassing the entire system of hydrogen formation and separation) and (ii) a feed stream containing both methane and non-methane hydrocarbons for hydrogen formation and separation. The methane separator can be a multistage device. As shown in the figures, the methane separator can include a first NGL separation stage to remove methane as a gas (e.g., along with lesser amounts of lower C2+ hydrocarbons), and have a second output of primarily C2+ hydrocarbons with some residual methane. The separated predominately methane gas stream is used as a second bypass/enrichment stream, whereas the liquid output from the NGL separation is passed to an NGL run tank in which the lighter hydrocarbons (e.g., methane, ethane, propane, etc.) will begin to vaporize before or in the NGL run tank and must be vented to avoid a pressure rise in the tank. Thus, the gas output from the NGL run tank includes a third bypass/enrichment stream including methane and minor amount of lower C2+ hydrocarbons, and the liquid output from the NGL run tank includes primarily C2+ hydrocarbons, but with less methane. The splitting into bypass/enrichment and feed streams can be performed independently of whether the methane separator is used. Suitably, up to three blending/enrichment stages can be used: (1) The initial process gas stream can be blended with the NGL run tank vented gas to form the initial product gas stream. (2) The initial product gas stream can be blended with the light gas (predominately methane) from the methane (e.g., JT) separation to form a second product gas stream. (3) The second product gas stream can be blended with the raw feed stream (e.g., pre-feed gas herein) to form a third product gas.

In a refinement, the non-methane hydrocarbons in the hydrocarbon gas feed stream are selected from C2 hydrocarbons, C3 hydrocarbons, C4 hydrocarbons, C5 hydrocarbons, C6 hydrocarbons, and combinations (e.g., mixtures) thereof. Examples of suitable non-methane hydrocarbons include ethane, propane, butane, pentane, and hexane, including linear and branched isomers thereof. More generally, the non-methane hydrocarbons can include hydrocarbons with two or more carbon atoms (e.g., "C2+ hydrocarbons"), for example including some hydrocarbons with more than six carbon atoms, for example including C7+, C8+, C9+, or C10+ hydrocarbons (e.g., up to C10, C12, or C15) such as naphtha, etc. In some embodiments, the non-methane hydrocarbons can include oxygenated hydrocarbons, for example alcohols such as a methanol, ethanol, n-propanol, isopropanol, etc. (e.g., C1, C2, C3, C4, C5, or C6 alcohols). Such alcohols can be included with the alkane hydrocarbons listed above, or instead of the alkane hydrocarbons listed above, for example including a hydrocarbon gas feed composed primarily of methanol as the reformation reactant. Other non-hydrocarbon components of the hydrocarbon gas feed stream can include carbon dioxide, nitrogen, water vapor, hydrogen sulfide, and combinations thereof.

In a refinement, the hydrocarbon gas feed stream comprises methane (i.e., in addition to non-methane hydrocarbons such as the C2+ hydrocarbons). Depending on the particular source of the feedstock, the methane content of the feed gas ranges up to 90 mol. % (or vol. %), with the C2+ hydrocarbons being substantially the balance of the feed. For example, the hydrocarbon gas feed stream suitably contains at least 20, 30, 40, 50, 60, or 70 mol. % methane and up to 50, 60, 70, 80, or 90 mol. % methane. Similarly, the hydrocarbon gas feed stream suitably contains less than 15, 10, 5, 2, 1, 0.5, 0.2, or 0.1 mol. % of gas species (e.g., nitrogen, carbon dioxide, or other inert gases) other than methane and non-methane hydrocarbons combined.

In a refinement, the hydrocarbon gas feed stream is substantially free from methane. This can be the case, for example, when methane is present in a flare gas/associated gas stream, but is substantially absent in the feed to the gas conversion system in the event of upstream JT or other NGL separation, or fractionation, or when using propane or other feed gas. For example, the hydrocarbon gas feed stream can be a result of upstream methane separation providing a feed gas with less than 20 mol. % (or vol. %) methane, with the C2+ hydrocarbons being substantially the balance of the feed. Thus, the hydrocarbon gas feed stream can be free or substantially free from methane. In various embodiments, the hydrocarbon gas feed stream suitably contains at least 0.01, 0.1, 0.2, 0.5, 1, 2, or 5 mol. % methane and up to 1, 2, 5, 10, 15, or 20 mol. % methane. Similarly, the hydrocarbon gas feed stream suitably contains less than 15, 10, 5, 2, 1, 0.5, 0.2, or 0.1 mol. % of gas species other than methane and non-methane hydrocarbons combined. When a non-methane-containing stream is used as the initial feedstock, the hydrocarbon gas feed stream suitably contains less than 15, 10, 5, 2, 1, 0.5, 0.2, or 0.1 mol. % of gas species other than all non-methane hydrocarbons combined (e.g., up to essentially 100 mol. % C2+ hydrocarbons of varying species in any suitable distribution).

In a refinement, the hydrogen separator is adapted to provide a hydrogen content of at 99.97 mol. % (e.g., on a mole, volume, or weight basis) in the hydrogen gas stream, which is a minimum specification for fuel cell grade hydrogen. Lower hydrogen contents are possible for other applications/uses. Suitably, the hydrogen separator separates up to 90% of the hydrogen in the reformate gas (e.g., at least 20, 30, 40, 50, 60, or 70% and up to 50, 60, 70, 80, or 90% hydrogen separation and recovery in the hydrogen gas stream). In various embodiments, the hydrogen gas stream can have a hydrogen content of at least 80, 85, 90, 95, 98, 99, 99.5. 99.9, 99.97, or 99.99 mol. % and/or up to 98, 99, 99.5, 99.8, 99.9, 99.97, 99.99, 99.999, or 100 mol. %. The tail gas remaining after hydrogen removal includes predominantly methane, hydrogen, and carbon monoxide. For example, the tail gas can include methane in an amount of about 30-70 mol. %, for example at least 30, 40, or 50 mol. % and/or up to 50, 60, or 70 mol. %. Similarly, the tail gas can include hydrogen in an amount of about 20-60 mol. %, for example at least 20, 30, or 40 mol. % and/or up to 40, 50, or 60 mol. %. Similarly, the tail gas can include carbon monoxide in an amount of about 5-30 mol. %, for example at least 5, 10, or 15 mol. % and/or up to 15, 20, or 30 mol. %. In embodiments where the tail gas (or a portion thereof) is withdrawn from the system as a designer fuel with a targeted composition, any of the foregoing component ranges can apply to the designer fuel as well. In embodiments where the tail gas (or portion thereof) is blended with other component(s) such as carbon dioxide (e.g., from a carbon dioxide separator or module), pipeline methane, synthetic natural gas (e.g., from an SNG module), etc., to provide a designer fuel with a target composition, the designer fuel can have alternative component ranges in addition to those mentioned above for the tail gas. For example, the designer fuel can include methane in an amount of about 50-99 mol. %, for example at least 50, 60, 70, 80, or 90 mol. % and/or up to 70, 80, 90, 95, 98, or 99 mol. %. Similarly, the designer fuel can include carbon oxides, hydrogen, or carbon oxides and hydrogen combined in an amount of about 0.1-50 mol. %, for example at least 0.1, 1, 2, 5, 10, 20, or 30 mol. % and/or up to 3, 5, 7, 10, 15, 20, 25, 30, 40, or 50 mol. %.

In a refinement, the hydrogen separator is selected from the group consisting of a membrane separator, a pressure-swing adsorption (PSA) separator, and a cryogenic separator. In some embodiments, the system can further include a dehydrator and/or compressor upstream of the hydrogen separator and downstream of the reactor(s) and cooler. For example, hydrogen separation can be performed at elevated pressures, for example up to 350-600 psi or 400-500 psi. Accordingly, in some embodiments and depending on the pressure of the incoming feed to the hydrogen separator, it can be desirable to include a compressor to increase the pressure of an incoming low-pressure feed (e.g., in a range of about 20-50 psi or 30-35 psi) up to the desired elevated pressure. In other embodiments, for example where the incoming hydrocarbon feed gas to the system is compressed to the elevated pressures, a compressor prior to the hydrogen separator can be omitted. Suitably, the system also includes a carbon dioxide separator as illustrated in the figures, for example an amine or other standalone apparatus separate from the hydrogen separator. Thus, the hydrogen separator can provide up to three outlets: a hydrogen gas stream, a carbon dioxide stream, and a residual product stream (e.g., including residual hydrogen, carbon dioxide, methane and non-methane hydrocarbons, etc.).

Carbon dioxide removal allows the gas conversion system the flexibility to provide product streams based on desired end uses. For example, carbon dioxide removal can be used in order to provide the produced hydrogen gas as "Blue" hydrogen, which increases the market value of the product. As background, there are three types/grades of hydrogen produced: 1) Grey hydrogen (produced from reformation without carbon capture and sequestration (CCS); Blue hydrogen (produced from hydrocarbons like reformation but with CCS); and 3) Green hydrogen (produced completely from renewable resources (typically electrolysis with energy provided via wind, solar or nuclear). Carbon dioxide removal (e.g., via CCS) can provide a green benefit and produce another source of revenue from sale and/or carbon/renewable energy credits. Carbon dioxide removal or separation can be performed by any suitable apparatus or combination of apparatus, for example a membrane separator and/or a scrubber. In an embodiment, the carbon dioxide separator is a full amine plant system (e.g., amine-based scrubber), for example including an amine contacting tower and amine recovery loop. Carbon monoxide is typically not removed from process streams; carbon monoxide can remain in a product gas and be consumed/combusted for its fuel value, or it can be converted to methane as a reactant in an SNG reactor or module. After carbon dioxide removal, the product gas or intermediate product gas can contain methane in a range of 10-90 mol. % (e.g., at least 10, 20, 30, 40, 50, 60, or 70 mol. % and/or up to 30, 40, 50, 60, 70, 80, or 90 mol. %), hydrogen in a range of 10-90 mol. % (e.g., at least 10, 20, 30, 40, 50, 60, or 70 mol. % and/or up to 30, 40, 50, 60, 70, 80, or 90 mol. %), carbon monoxide in a range of 0.01-10 mol. % (e.g., at least 0.01, 0.1, 0.2, or 0.5 mol. % and/or up to 1, 2, 3, 5, 7, or 10 mol. %), water in a range of 0.01-5 mol. % (e.g., at least 0.01, 0.1, 0.2, or 0.5 mol. % and/or up to 0.5, 1, 2, 3, or 5 mol. %), and/or less than 0.1, 0.01, or 0.001 mol. % carbon dioxide.

Selection and control of hydrogen, methane, and/or carbon dioxide content of the product streams also allows the gas conversion system the flexibility to provide fuel streams according to a user-specific set of criteria (e.g., a "designer" fuel). System capacity and production can be autonomously and independently varied among the primary hydrogen, methane, and carbon dioxide products such that one or more gas streams with desired hydrogen, methane, and/or carbon dioxide contents can be produced based on user demand. The gas conversion system permits removal of product streams and/or addition of product streams to produce a fuel tailored to specific applications, providing optimum fuel parameters for reciprocating and turbine engine performance. For example, reciprocating and turbine engine manufacturers consider fuel diluent (carbon dioxide) and hydrogen (H2) content as highly beneficial additions to a methane-based fuel. Specifically: 1) the system can adjust the diluent content (carbon dioxide) of a methane-based fuel to target values consistent with lower engine emissions and better engine performance and longer life, 2) the system can adjust the hydrogen content in a methane-based fuel to provide performance, life, and emissions benefits to engine/turbine performance, and 3) the system can control other parameters like heating value, C2+ content, Wobbe Index, etc. to benefit performance, life, and emissions. In another mode of operation, the system is used a hydrogen-production (e.g., HHR/HHR) configuration for the production of designer fuels only such that the hydrogen gas is not separated into a final, substantially pure hydrogen gas product, but instead included as a fuel component. For example, there may be applications where removing hydrogen gas is not desired and production of a tailored methane-based fuel is desired.

In another aspect, the disclosure relates to a method for forming at least one of (i) a hydrogen gas stream and (ii) a product gas stream from a hydrocarbon gas feed stream comprising non-methane hydrocarbons and optionally methane, the method comprising: feeding the hydrocarbon gas feed stream to a hydrocarbon or gas conversion system according to any of the foregoing embodiments, thereby forming at least one of (i) a hydrogen gas stream and (ii) a product gas stream, for example with the various intermediate steps of heating, cooling, mixing, reacting, separating, etc. For example, a modular hydrocarbon or gas conversion system as described herein can be used to form one or both of a hydrogen gas stream and a product gas stream comprising methane (e.g., synthetic natural gas, tail gas, designer fuel). The method can optionally include adding an additional product stream (e.g., carbon dioxide, synthetic natural gas, and/or tail gas from the modular system or otherwise) to at least one of the hydrogen gas stream and the product gas stream, thereby forming a designer fuel stream having a selected composition. Further, hydrogen gas can be formed using a gas conversion system as described above with one, two, or more HHR units. Similarly, a modal gas conversion system as described above can be used to form hydrogen gas, methane, or both (i.e., when switching between modes) with at least one HHR unit and at least lone HHR/SNG unit.

While the disclosed methods, systems, apparatus, and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

Figure 1:
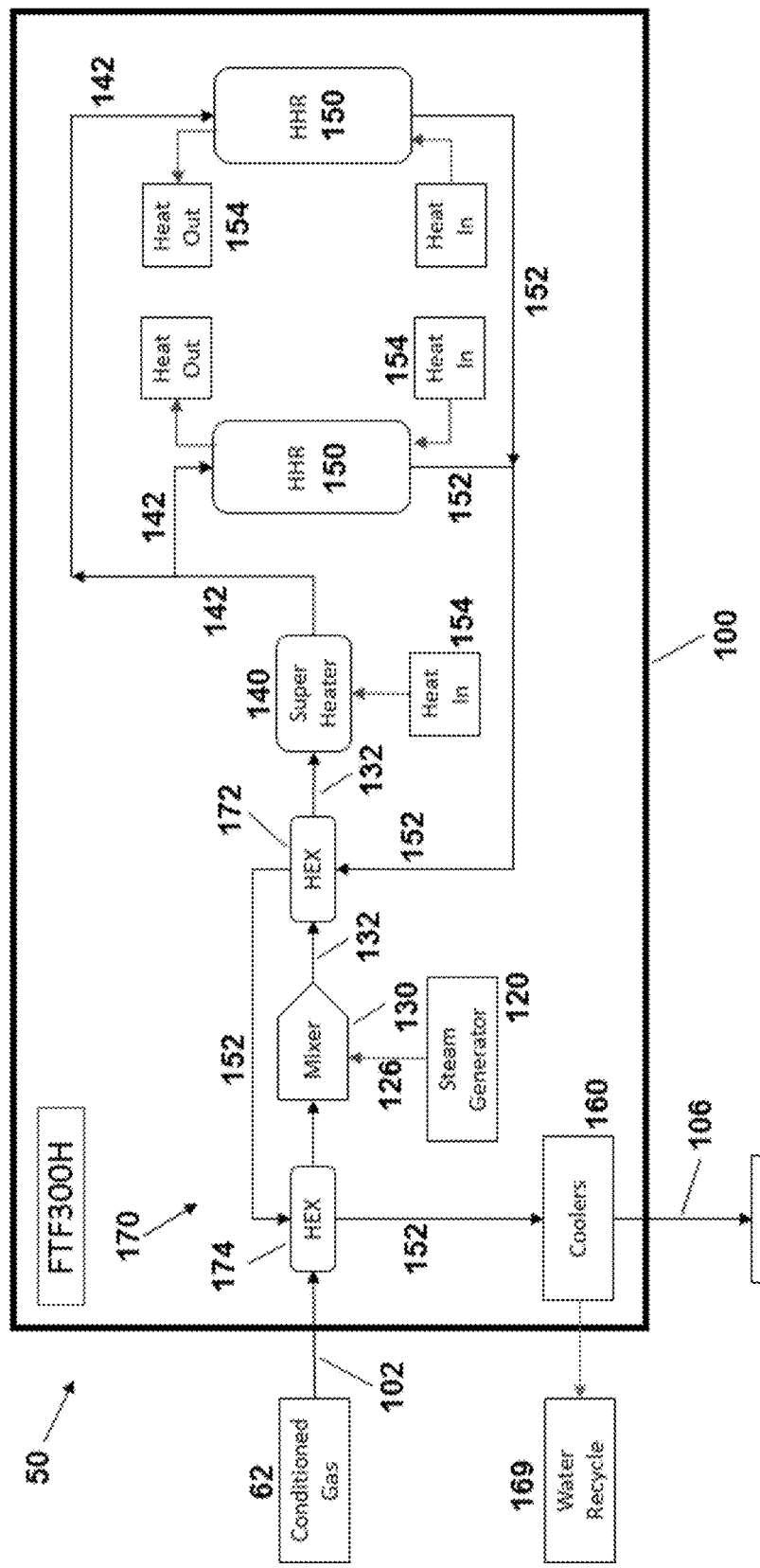
FIG. 1 is a process flow diagram illustrating representative unit operations and streams in the disclosed gas conversion system used for hydrogen gas production.

The disclosure generally relates to methods, systems, and apparatus to produce a hydrogen gas stream (e.g., a substantially pure hydrogen gas stream), a carbon dioxide gas stream (e.g., a substantially pure carbon dioxide gas stream), and a high quality, methane rich gas stream from flare gas or other hydrocarbon feed gas streams. Hydrocarbon feed gas streams are reformed, cracked, or converted into a syngas stream and methane gas stream by receiving a volume of hydrocarbon feed gas, where the volume of hydrocarbon feed gas includes a volume of methane (C1) and a volume of non-methane (C2+) hydrocarbons. The method can control both an inlet flow of the volume of hydrocarbon feed gas and a volume of steam to at least one reformer system that will reform, crack, or convert at least a portion of the volume of C2+ hydrocarbons (e.g., with or without methane present). In this way, the steam reformer system(s) generates a volume of syngas and a volume of methane gas from the volume of hydrocarbon feed gas and the volume of steam. The hydrogen contained in the syngas may be separated into a high purity hydrogen gas stream by various technologies including membrane separation and pressure swing adsorption ("PSA") systems leaving a residual, predominately methane and carbon oxide gas stream. The separated hydrogen or the residual predominately methane and carbon oxide stream may be combined with the hydrocarbon feed gas to form an enriched product gas with targeted quality values including heating value, methane number or Wobbe index. In this way, the hydrogen gas and the residual predominately methane and carbon oxide gas is made available for use on-site as a fuel or for compression or liquefaction and storage or transportation off-site.

The disclosure further relates to methods, systems, and apparatus to produce a hydrogen gas stream (e.g., a substantially pure hydrogen gas stream) and a high quality, methane rich gas stream from flare gas or other hydrocarbon feed gases by receiving a volume of the hydrocarbon feed gas, where the volume of hydrocarbon feed gas includes a volume of methane (C1) and a volume of C2+ hydrocarbons. The method separates the hydrocarbon feed gas into a predominately methane gas stream and a predominately C2+ hydrocarbon gas stream using various gas separation technologies including Joule-Thompson, mechanical refrigeration and membrane systems. The method can control both an inlet flow of the volume of C2+ hydrocarbons and a volume of steam to at least one reformer system that will reform, crack, or convert at least a portion of the volume of predominately C2+ hydrocarbons. In this way, the steam reformer system(s) generates a volume of syngas and a volume of methane gas from the volume of predominately C2+ hydrocarbons and the volume of steam. The method may then further separate the hydrogen gas contained in the syngas into a separate high purity hydrogen gas stream by any of various technologies including membrane and pressure swing adsorption ("PSA") systems leaving a residual, predominately methane and carbon oxide gas stream. The separated hydrogen or the predominately methane and carbon oxide stream may be combined with the predominately methane gas separated from the hydrocarbon feed gas and/or with the hydrocarbon feed gas to produce an enriched product gas with targeted gas quality values including specific heating value, methane number or Wobbe index. In this way, the hydrogen gas and the predominately methane and carbon oxide gas is made available for use on-site as a fuel or for compression or liquefaction and transportation off-site.

In a particular aspect, the disclosure relates to modular systems, methods, and apparatus to produce one or both of (i) a hydrogen gas stream (e.g., a substantially pure hydrogen gas stream), and (ii) a methane-containing product stream (such as methane rich gas stream or a methane/hydrogen blend) from non-methane hydrocarbon feed gas streams. The modular systems allow flexible fuel production ranging from fuel cell grade hydrogen to pipeline quality methane to site-specific "designer fuel" blend containing methane, hydrogen, and (optionally) carbon dioxide according to a given user's specifications. The modular design allows quick configuration and onsite installation and assembly of a system tailored to a specific user's needs. Using a modular design, an HHR module as the core component is flexible in that it can provide a platform gas output with a targeted, selectable distribution between primary hydrogen and methane components using a single, consistent installed/assembled set of unit operations. By varying operating conditions such as steam:carbon ratio and HHR reactor temperature, relative conversion and selectivity of steam reformation and methanation reactions in the HHR reactor can be controlled within wide ranges such the composition of the platform gas can include a relatively higher fraction of hydrogen product (e.g., compared to methane) when hydrogen is the ultimate desired product, the platform gas can include a relatively higher fraction of methane product (e.g., compared to hydrogen) when methane is the ultimate desired product, the platform gas can include a balanced blend of hydrogen and methane when both are desired ultimate products, etc. This flexibility of the HHR module platform gas output, which is obtainable using a single installed arrangement of unit operations in the HHR module, allows selection of further downstream unit operation modules to provide fuel product outputs corresponding specifically to a given user's needs. Such downstream modules can include those directed to carbon dioxide separation, hydrogen separation, and/or SNG production.

Another embodiment of the disclosure relates to methods, systems, and apparatus to produce a high purity hydrogen gas stream and a methane rich gas stream from flare gas or other hydrocarbon feed gases, as described above, wherein the syngas is further processed in a water gas shift reactor to increase the hydrogen content prior to its separation by membrane, PSA or other technologies.

Another embodiment of the disclosure relates to methods, systems, and apparatus to produce a high purity hydrogen gas stream and a methane rich gas stream from C2+ hydrocarbons wherein the system feed gas does not include methane gas. Possible feed gases include ethane, propane, butane and other C2+ hydrocarbons.

Figure 2:
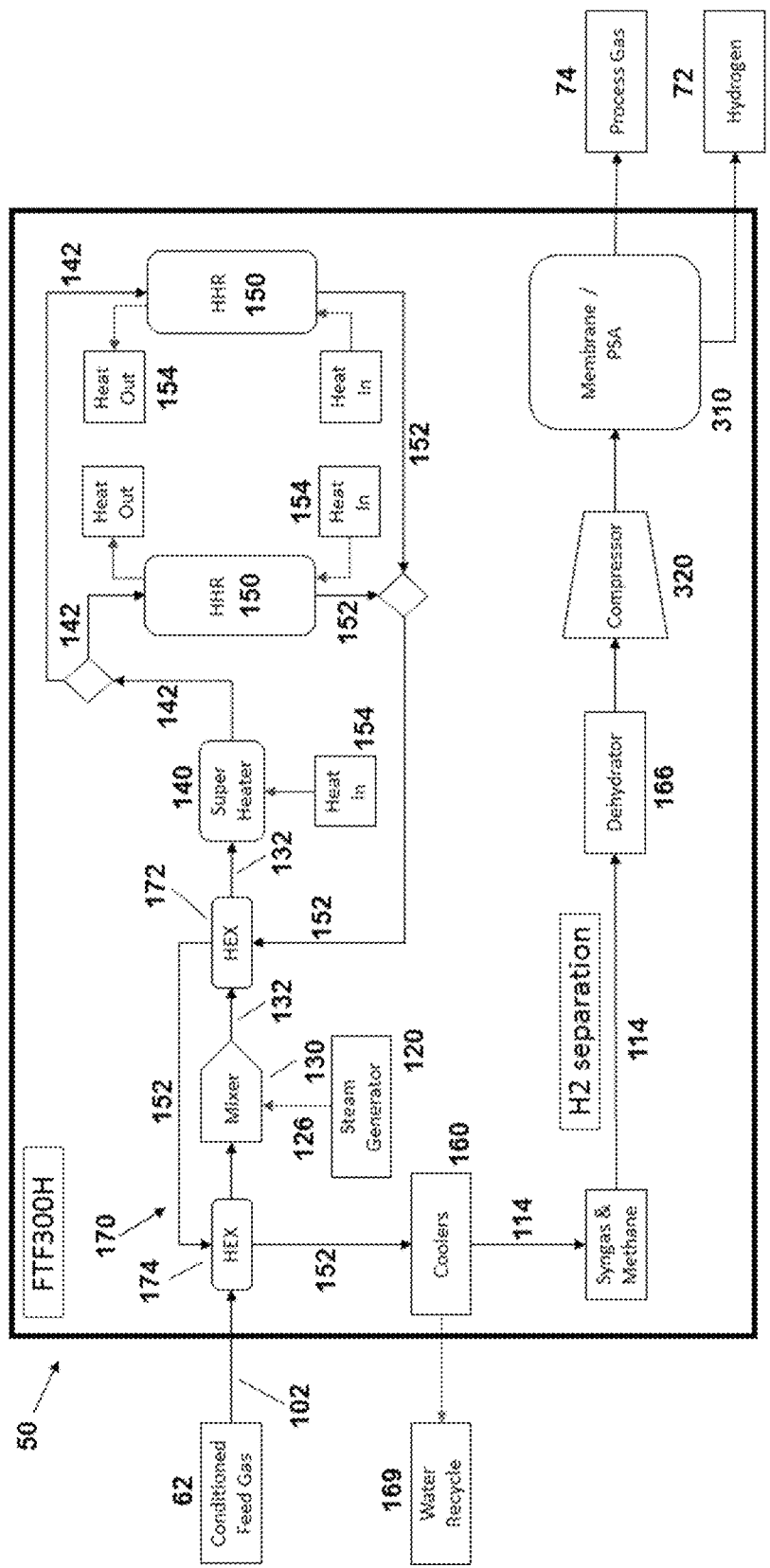
FIG. 2 is a process flow diagram illustrating representative unit operations and streams in the disclosed gas conversion system used for hydrogen gas production, further including a hydrogen separator for production of essentially pure hydrogen gas.
Figure 3:
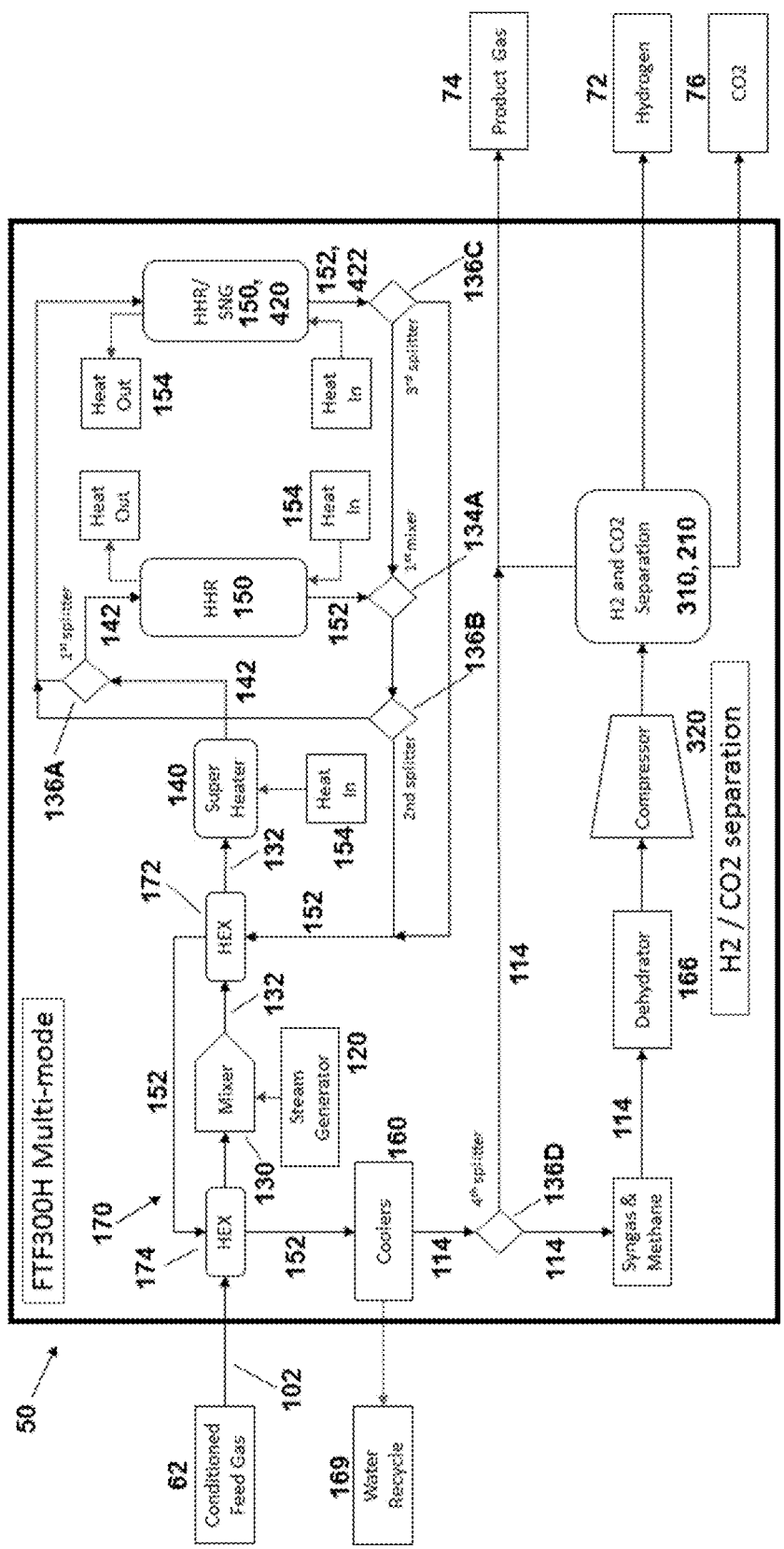
FIG. 3 is a process flow diagram illustrating representative unit operations and streams in the disclosed modal gas conversion system used for either hydrogen gas production or methane production using the same unit operations.

FIGS. 1-2 include process flow diagrams illustrating representative unit operations and streams in the disclosed hydrocarbon or gas conversion system 50 used for hydrogen gas production.

A hydrocarbon gas feed 62 including non-methane hydrocarbons and optionally methane is fed as a conditioned gas to a mixer 130 which receives steam 126 from a steam generator 120. The mixer 130 outputs a corresponding feed gas 132 including the hydrocarbon gas feed stream and water (e.g., steam) in admixture. Heat exchangers (HEX) 170, for example illustrated as a first heat exchanger 172 and a second heat exchanger 174, can be included upstream and downstream of the mixer 130 to adjust the temperature of the hydrocarbon gas feed 62 and corresponding feed stream using heat from the reformate streams 152. The feed gas 132 is then fed to a super heater 140, which superheats the feed gas 132 to a selected temperature and outputs a superheated feed gas 142. The superheated feed gas 142 is then fed to a first HHR reactor 150, which contains a catalyst adapted to react at least a portion of non-methane hydrocarbons in the superheated feed gas 142 into carbon oxides and hydrogen, thereby forming a reformate 152 including carbon oxides, hydrogen, and optionally methane. As illustrated, a second HHR reactor 150 can be included to operate in parallel with the first reactor 150. More generally, any number of HHR reactors 150 can be used. As further illustrated, the HHR reactors 150 can include countercurrent heat exchange streams 154 to maintain approximately isothermal operating conditions in the reactors 150. The reformate streams 152 exiting the HHR reactors 150 can be passed through a cooler 160 to remove water 169, which can be recycled, for example to the steam generator 120. In the embodiment shown in FIG. 1, the dried reformate 114 can be recovered as the product gas 74 as a mixture of syngas (i.e., carbon oxides and hydrogen) as well as any methane originally present in the feed or produced by methanation in the HHR reactors 150. In the embodiment shown in FIG. 2, the dried reformate 114 is further passed through a hydrogen separator 310 to form a product gas stream 74 including the carbon oxides and a hydrogen gas stream 72 including the separated hydrogen. Other upstream unit operations such as a dehydrator 166 and/or a compressor 320 can be used depending on the state of the dried reformate.

FIGS. 3-6 include process flow diagrams illustrating representative unit operations and streams in the disclosed modal gas conversion system 50 used for either hydrogen gas production or methane production using the same unit operations.

Figure 4:
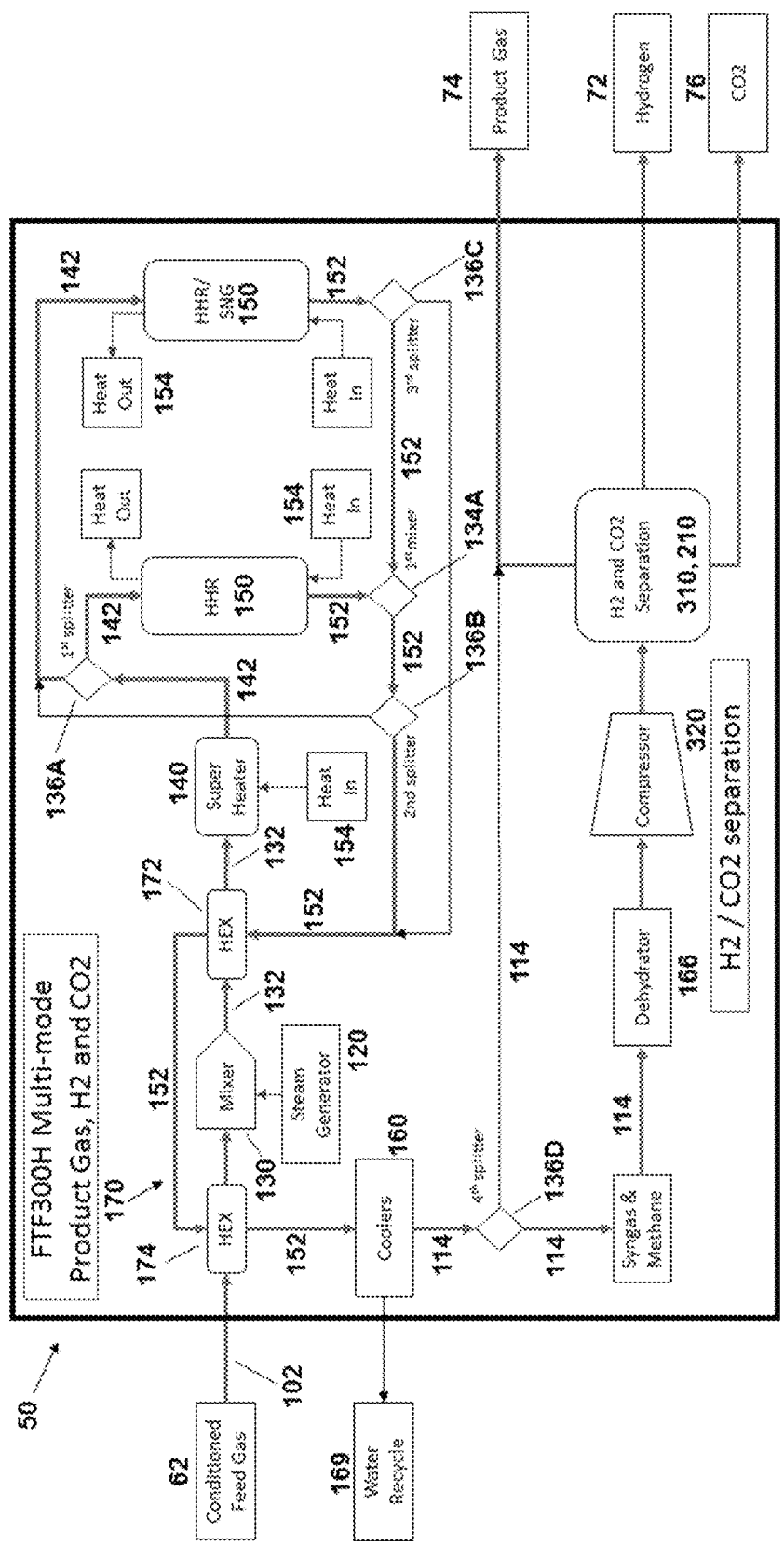
FIG. 4 is a process flow diagram illustrating the modal gas conversion system of FIG. 3 in the first mode with hydrogen separation.
Figure 5:
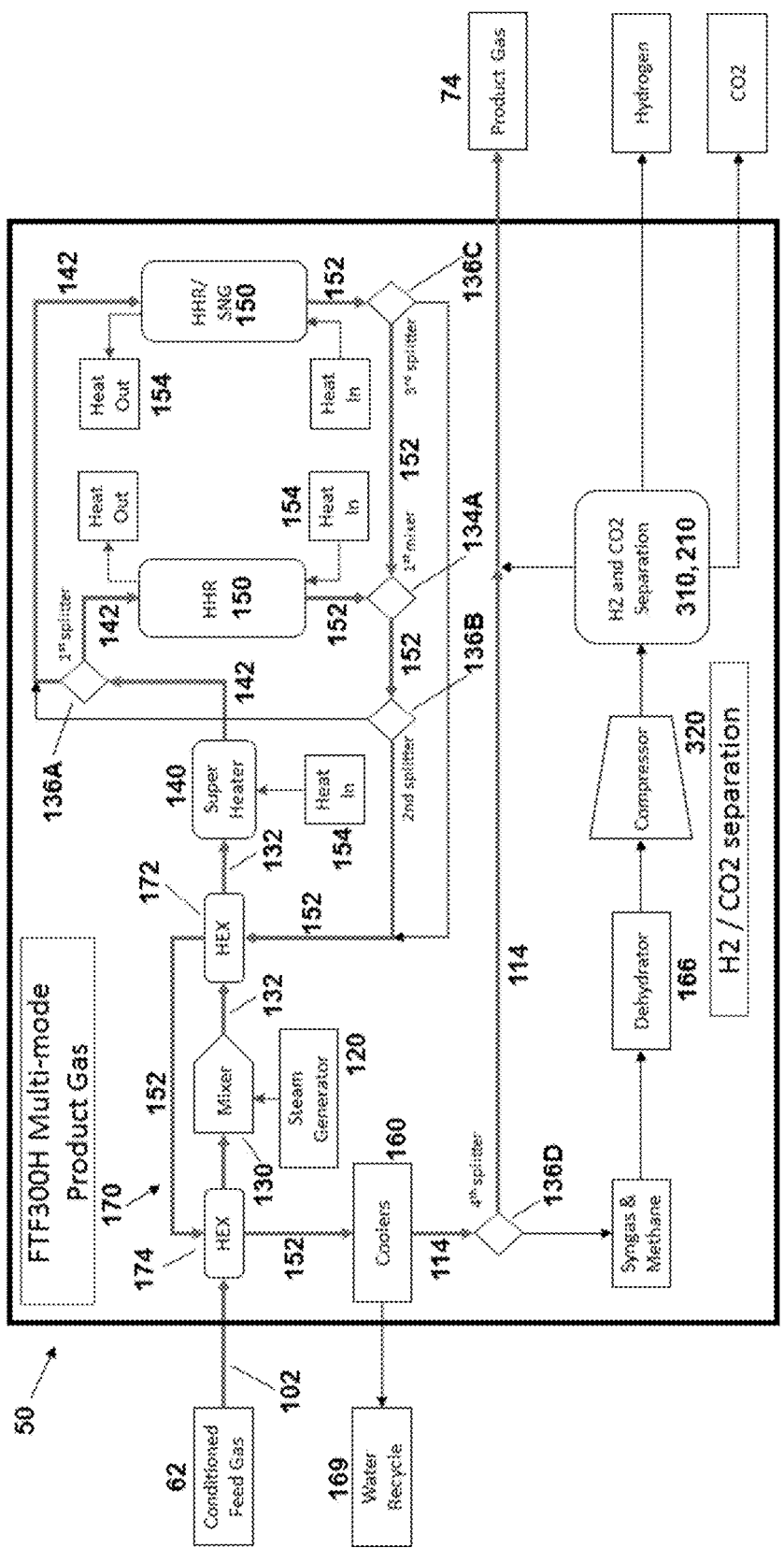
FIG. 5 is a process flow diagram illustrating the modal gas conversion system of FIG. 3 in the first mode without hydrogen separation.
Figure 6:
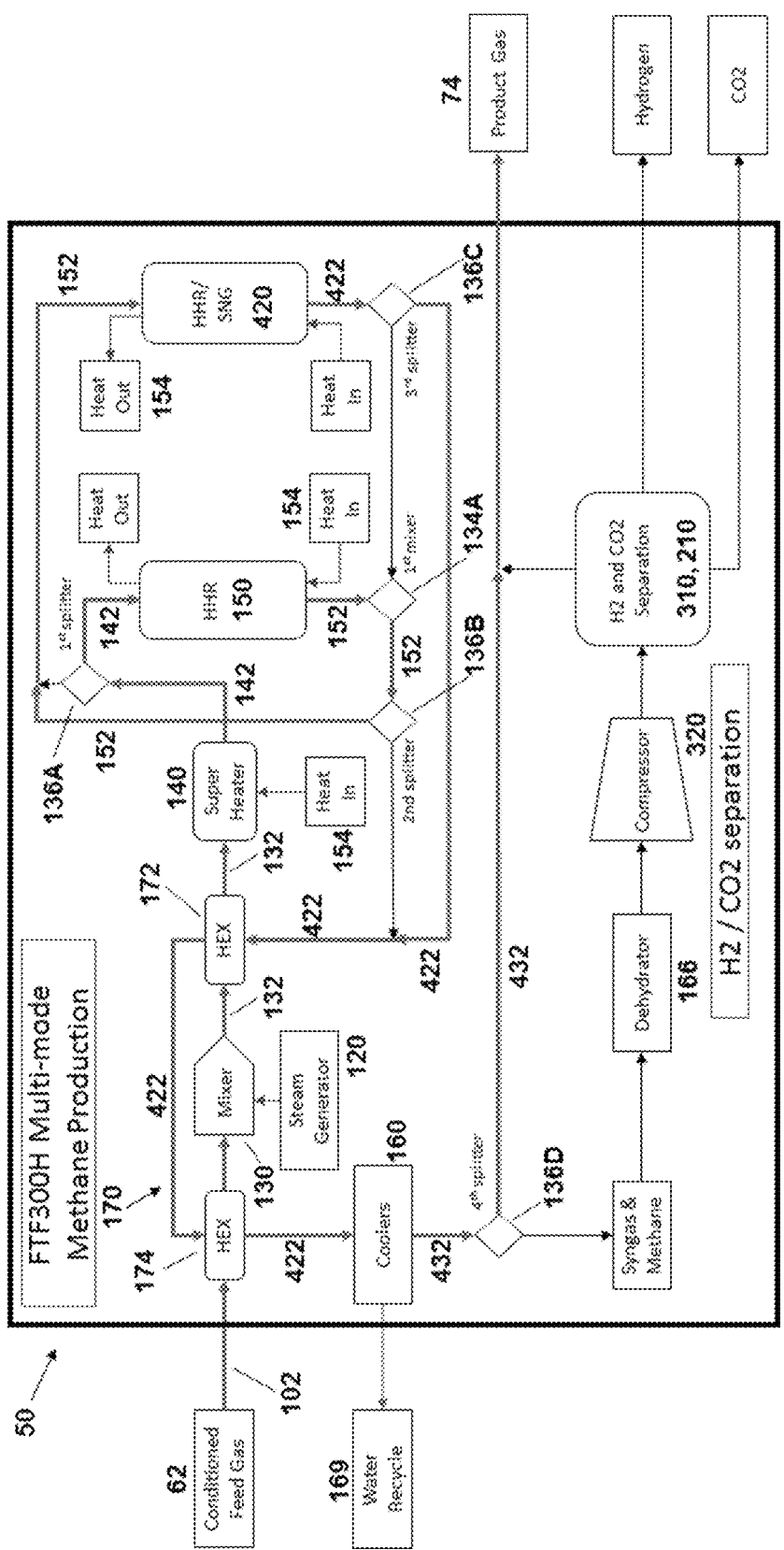
FIG. 6 is a process flow diagram illustrating the modal gas conversion system of FIG. 3 in the second mode.

The modal gas conversion system 50 is similar to that described above with respect to FIGS. 1-2, but it further includes flow splitters 136A, B, C, D and flow mixers 134A that can be set to direct flow through the system 50 such that the system operates either in a first (HHR) mode for hydrogen generation or a second (SNG) mode for methane production. In the first mode, the superheated feed gas 142 is split into two (or more) parallel streams for reaction in HHR reactors 150, thus forming a hydrogen gas product. In the second mode, superheated feed gas 142 is fed in series to a first HHR reactor 150 (labeled as left HHR in the figures) for syngas production, and then to a second SNG reactor 420 (labeled as right HHR/SNG in the figures), thus forming a methane gas product. FIG. 4 illustrates operation in the first mode for hydrogen generation, where hydrogen gas is recovered as a product. Carbon dioxide as well as process gas (e.g., carbon dioxide, residual hydrocarbons) are also separated as product streams. FIG. 5 illustrates operation in the first mode for hydrogen generation, where hydrogen gas is left as a component of the product gas (i.e., further including carbon oxides as a syngas). FIG. 6 illustrates operation in the second mode for methane generation, where the product gas includes methane as well as any unreacted carbon oxides, hydrogen, or heavier hydrocarbons.

Figure 7:
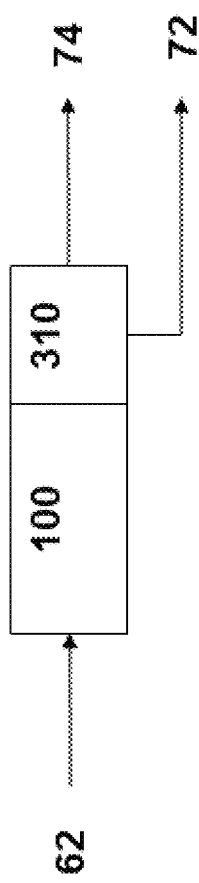
FIG. 7 is a process flow diagram illustrating representative flow rates and energy contents for streams in the disclosed gas conversion system used for hydrogen gas production in an embodiment without bypass/enrichment of the product stream.
Figure 8:
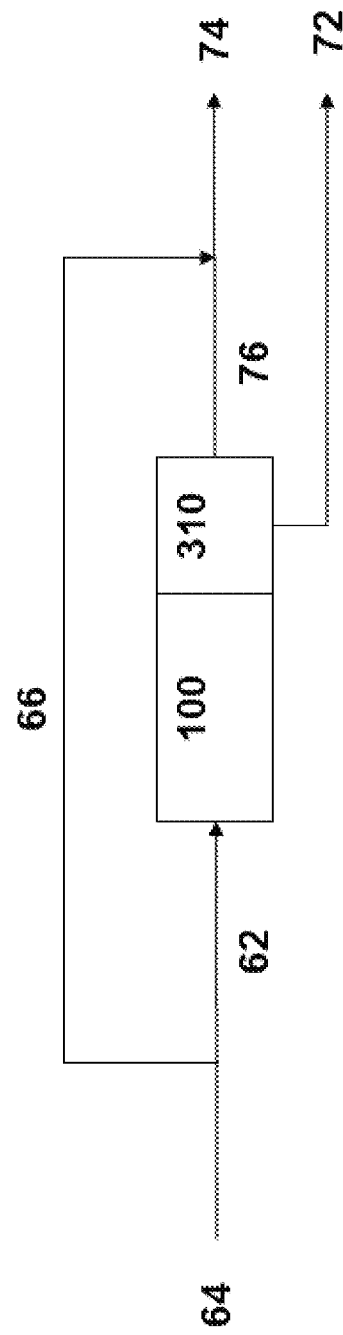
FIG. 8 is a process flow diagram illustrating representative flow rates and energy contents for streams in the disclosed gas conversion system used for hydrogen gas production in an embodiment including a raw flare/associated gas bypass stream for enrichment of the product stream.
Figure 9:
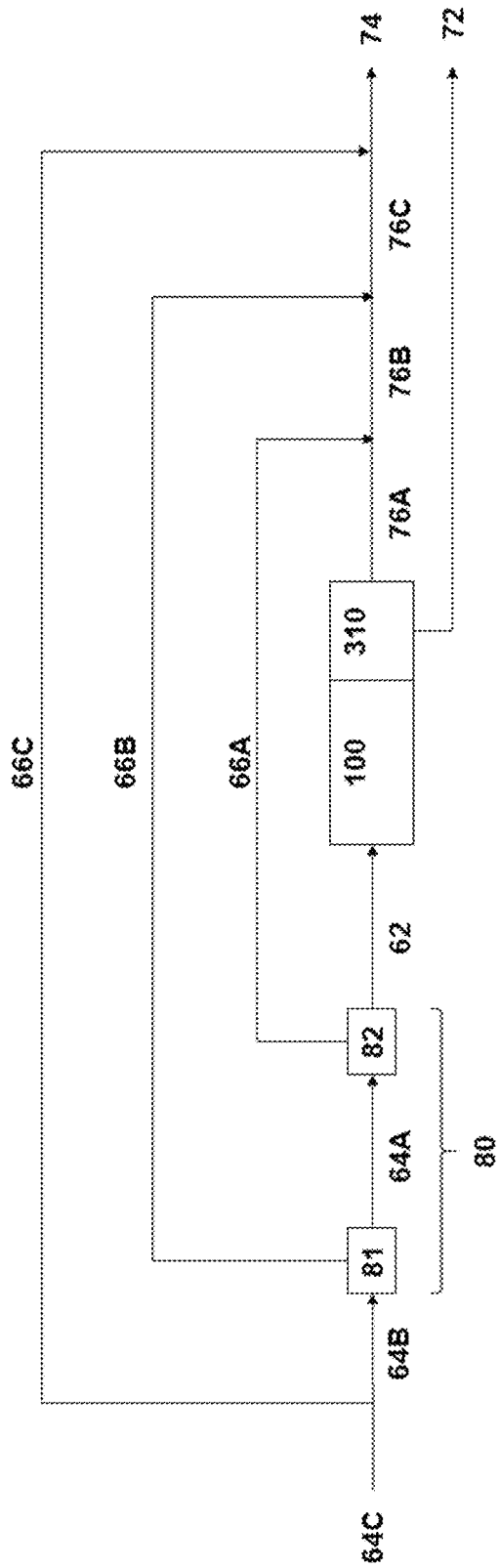
FIG. 9 is a process flow diagram illustrating representative flow rates and energy contents for streams in the disclosed gas conversion system used for hydrogen gas production in an embodiment including both (i) a raw flare/associated gas bypass stream and (ii) a methane/light gas bypass stream for enrichment of the product stream.
Figure 10:
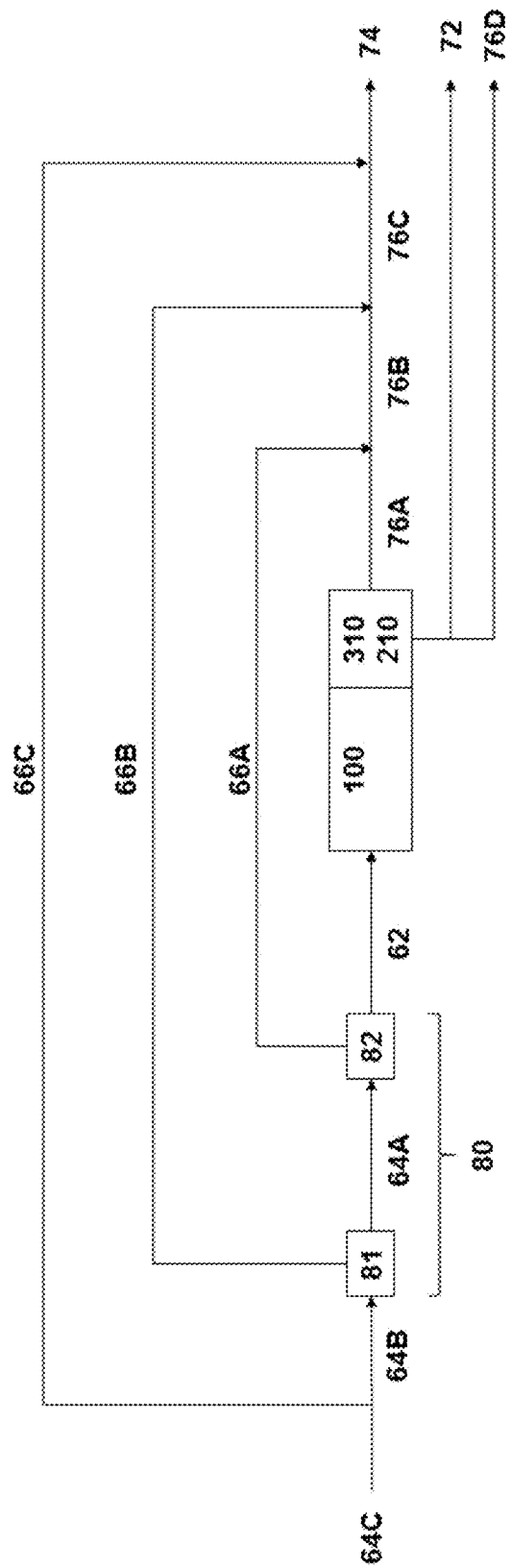
FIG. 10 is a process flow diagram illustrating representative flow rates and energy contents for streams in the disclosed gas conversion system used for hydrogen gas production in an embodiment including (i) a raw flare/associated gas bypass stream for enrichment of the product stream, (ii) a methane/light gas bypass stream for enrichment of the product stream, (iii) hydrogen gas stream separation, and (iv) carbon dioxide gas stream separation.

FIGS. 7-10 include process flow diagrams illustrating representative flow rates and energy contents for streams in the disclosed gas conversion system 50 incorporating an HHR module 100 and hydrogen separator 310 used for hydrogen gas production to provide a hydrogen gas stream 72, a product gas stream 74, and optionally one or more additional product stream(s) 76, 76A, 76B, 76C, 76D. FIG. 7 illustrates an embodiment without any feed bypass or product enrichment streams. FIG. 8 illustrates an embodiment including a raw flare/hydrocarbon feed gas bypass stream 66 for enrichment of the product stream 74. FIG. 9 illustrates an embodiment including both (i) a raw flare/hydrocarbon feed bypass stream 66C and (ii) methane/light gas bypass streams 66B, 66A from a methane separator 80 (e.g., including an NGL separator 81 and an NGL run tank 82 as illustrated) for enrichment of the product stream 74. FIG. 10 illustrates an embodiment including (i) a raw flare/hydrocarbon feed bypass stream 66C for enrichment of the product stream 74, (ii) methane/light gas bypass streams 66B, 66A for enrichment of the product stream 74, (iii) hydrogen gas stream 72 separation via a hydrogen separator 310, and (iv) carbon dioxide gas stream 76D separation via a carbon dioxide separator 210. Tables 1-4 below provide a summary of the flow rates and energy contents for streams in FIGS. 7-10.

TABLE 1

Stream Properties for FIG. 7

| Name | Stream | Flow Rate (mscfd) | Energy (btu/scf) | Other |
|---|---|---|---|---|
| Raw Flare Feed | 62 | 360 | 1351 | |
| Product Gas | 74 | 689 | 565 | 1.7 MW 1816 DGE/month |
| Hydrogen Gas | 72 | | | 1030 kg/day |

TABLE 2

Stream Properties for FIG. 8

| Name | Stream | Flow Rate (mscfd) | Energy (btu/scf) | Other |
|---|---|---|---|---|
| Raw Flare Feed | 62 | 360 | 1351 | |
| Raw Flare Feed | 64 | 1521 | 1351 | |
| Raw Flare Enrichment | 66 | 1109 | 1351 | |

TABLE 2-continued

Stream Properties for FIG. 8

| Name | Stream | Flow Rate (mscfd) | Energy (btu/scf) | Other |
|---|---|---|---|---|
| Process Gas | 76 | 689 | 565 | |
| Product Gas | 74 | 1798 | 1050 | 8.4 MW 443,480 DGE/month |
| Hydrogen Gas | 72 | | | 1030 kg/day |

TABLE 3

Stream Properties for FIG. 9

| Name | Stream | Flow Rate (mscfd) | Energy (btu/scf) | Other |
|---|---|---|---|---|
| NGL Tank Liquids | 62 | 149 | 3050 | |
| NGL Tank | 64A | | | |
| Raw Flare Feed | 64B | 1285 | 1349 | |
| Raw Flare Feed | 64C | 2317 | 1351 | |
| NGL Tank Light Gas | 66A | 134 | 1512 | |
| JT Light Gas | 66B | 1002 | 1074 | |
| Raw Flare Enrichment | 66C | 923 | 1351 | |
| Process Gas 1 | 76A | 683 | 517 | |
| Process Gas 2 | 76B | 817 | 680 | |
| Product Gas 1 | 76C | 1819 | 897 | |
| Product Gas 2 | 74 | 2741 | 1050 | 13 MW |
| Hydrogen Gas | 72 | | | 1042 kg/day |

TABLE 4

Stream Properties for FIG. 10

| Name | Stream | Flow Rate (mscfd) | Energy (btu/scf) | Other |
|---|---|---|---|---|
| NGL Tank Liquids | 62 | 147 | 3050 | |
| NGL Tank | 64A | | | |
| Raw Flare Feed | 64B | 1264 | 1349 | |
| Raw Flare Feed | 64C | 1603 | 1351 | |
| NGL Tank Vent Gas | 66A | 132 | 1512 | |
| NGL Separation Light Gas | 66B | 986 | 1074 | |
| Raw Flare Enrichment | 66C | 223 | 1351 | |
| Process Gas | 76A | 467 | 725 | |
| Product Gas 1 | 76B | 599 | 898 | |
| Product Gas 2 | 76C | 1585 | 1008 | |
| Product Gas 3 | 74 | 1808 | 1050 | 8 MW 445915 DGE/month |
| Hydrogen Gas | 72 | | | 1151 kg/day |
| Carbon Dioxide Gas | 76D | | | 13159 kg/day |

FIGS. 11-16 include process flow diagrams illustrating representative unit operations and streams in the disclosed hydrocarbon or gas conversion system 50 used to produce one or both of hydrogen gas and a product gas comprising methane using the same unit operations in various modular arrangements. As illustrated, the hydrocarbon or gas conversion system 50 includes an HHR module 100 alone or in combination with one or more other separators or modules, for example including a carbon dioxide module 200, a hydrogen separator module 300, and/or an SNG module 400.

Figure 11:
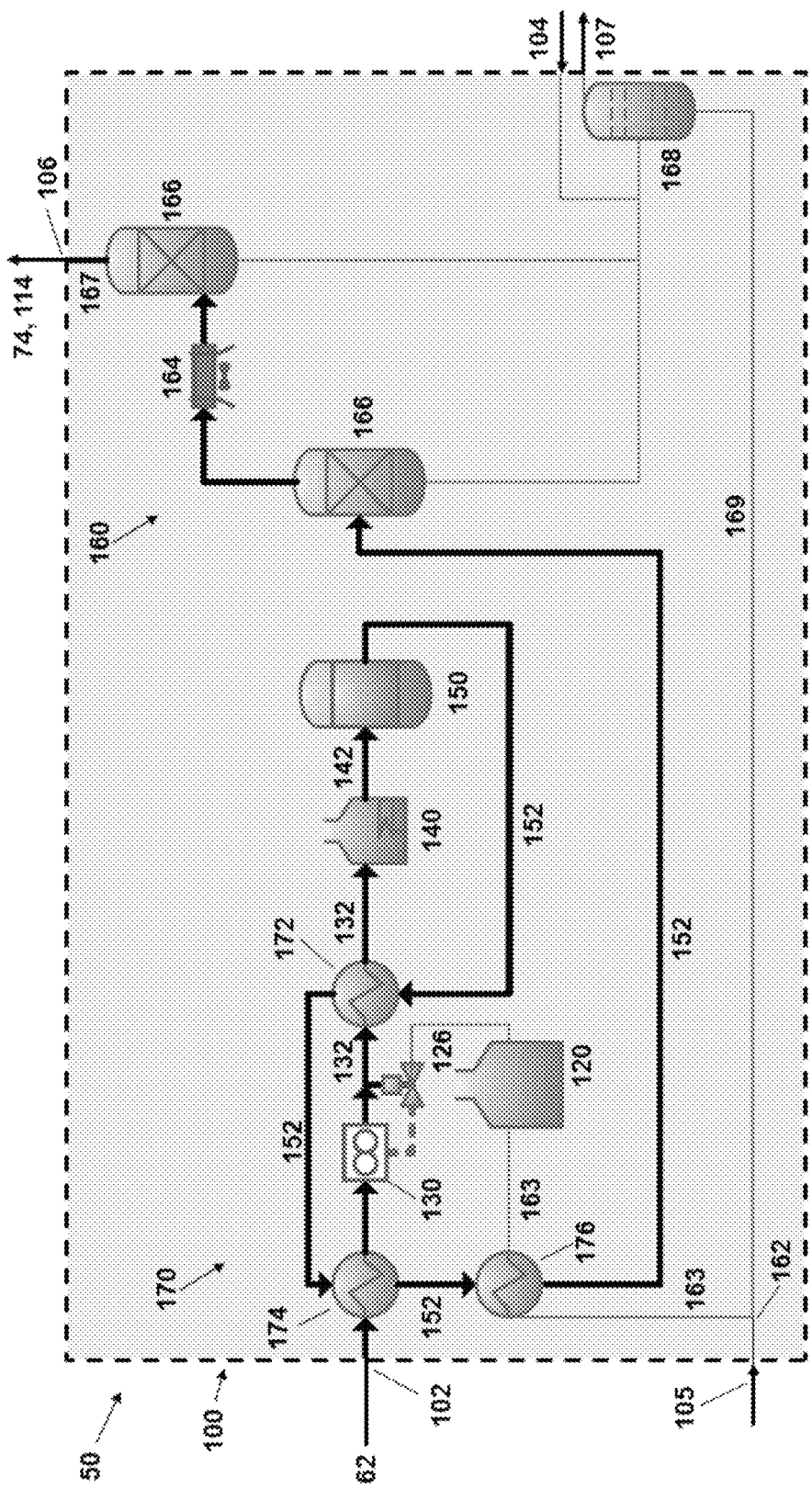
FIG. 11 is a process flow diagram illustrating representative unit operations and streams in an HHR module of the disclosed gas conversion system.

As illustrated in FIG. 11, the HHR module 100 can include a first (HHR) inlet 102 for a hydrocarbon feed, a second (HHR) inlet 104 for recycled system water, a third (HHR) inlet 105 for makeup water, a first (HHR) outlet 106 for platform gas, and a second (HHR) outlet 107 for deaerated reformate gas. A hydrocarbon gas feed 62 including non-methane hydrocarbons is fed to a mixer 130 which receives steam 126 from a steam generator 120. The mixer 130 outputs a corresponding feed gas 132 including the hydrocarbon gas feed stream and water (e.g., steam) in admixture. Recuperative heat exchangers (HEX) 170, for example illustrated as a first heat exchanger 172, a second heat exchanger 174, and a third heat exchanger 176, can be included upstream and downstream of the mixer 130 to adjust the temperature of the hydrocarbon gas feed 62 and corresponding feed stream using heat from the reformate streams 152 as the hot side heat exchange fluids. The feed gas 132 is then fed to a super heater 140, which superheats the feed gas 132 to a selected temperature and outputs a superheated feed gas 142. The superheated feed gas 142 is then fed to a first (HHR) reactor 150, which contains a catalyst adapted to react at least a portion of non-methane hydrocarbons in the superheated feed gas 142 into carbon oxides, hydrogen, and methane via equilibrium steam reformation and methanation reactions. Suitable catalysts for the first (HHR) and second (SNG) reactors in the various embodiments are not particularly limited, and can include a variety of commercially available catalysts such as commercial steam reforming catalysts. Examples include an AR-401 catalyst (nickel catalyst on activated magnesium alumina spinel support; available in pellet form or a disc with holes from Haldor Topsoe), a CRG-LHR catalyst (precipitated catalyst with nickel active component; available in pellet form from Johnson Matthey), an MC-750R catalyst (nickel-based catalyst; available in pellet form from Unicat), and a REFORMAX 100RS catalyst (nickel-based catalyst; available in pellet form from Clariant).

The product output of the first reactor 150 is a (wet) reformate 152 including carbon oxides, hydrogen, methane, and water. More generally, any number of first reactors 150 can be used for example in parallel to increase capacity of the HHR module 100. The reformate stream 152 exiting the first reactor 150 can be passed through the recuperative heat exchangers 170 and then to a cooler or water separation unit 160 to remove water, which can be recycled, for example to the steam generator 120. In the embodiment shown in FIG. 11, the cooler 160 can include a first water separator 166 to remove some water condensed after passing through the recuperative heat exchangers 170, followed by a chiller 164 to further cool and condense water that can be removed from the reformate in a second water separator 166 to form a dried reformate 167 with a substantially reduced water content. The system water recovered from the water separators 166 can be passed to a deaerator 168 to separate and remove some reformate compounds (e.g., minor amounts of methane, carbon dioxide, hydrogen) via the second outlet 107, thereby forming a recycled system water stream 169. The recycled system water 169 can be mixed with further recycled system water 112 from downstream modules as well as fresh or makeup water via the third inlet 105, for example in a collection point or water reservoir 162 to provide system water 163 back to the steam generator 120.

The dried reformate 167 exits the HHR module 100 via the first outlet 106 as a platform gas 114. In some embodiments, the platform gas 114 can be recovered and used as a product gas 74 as a mixture of methane, hydrogen, and carbon dioxide without the need for further downstream separation and/or reaction unit operations. In other embodiments, the platform gas 114 can represent an intermediate product that is passed as a feed to one or more further downstream separation and/or reaction unit operations.

Figure 12:
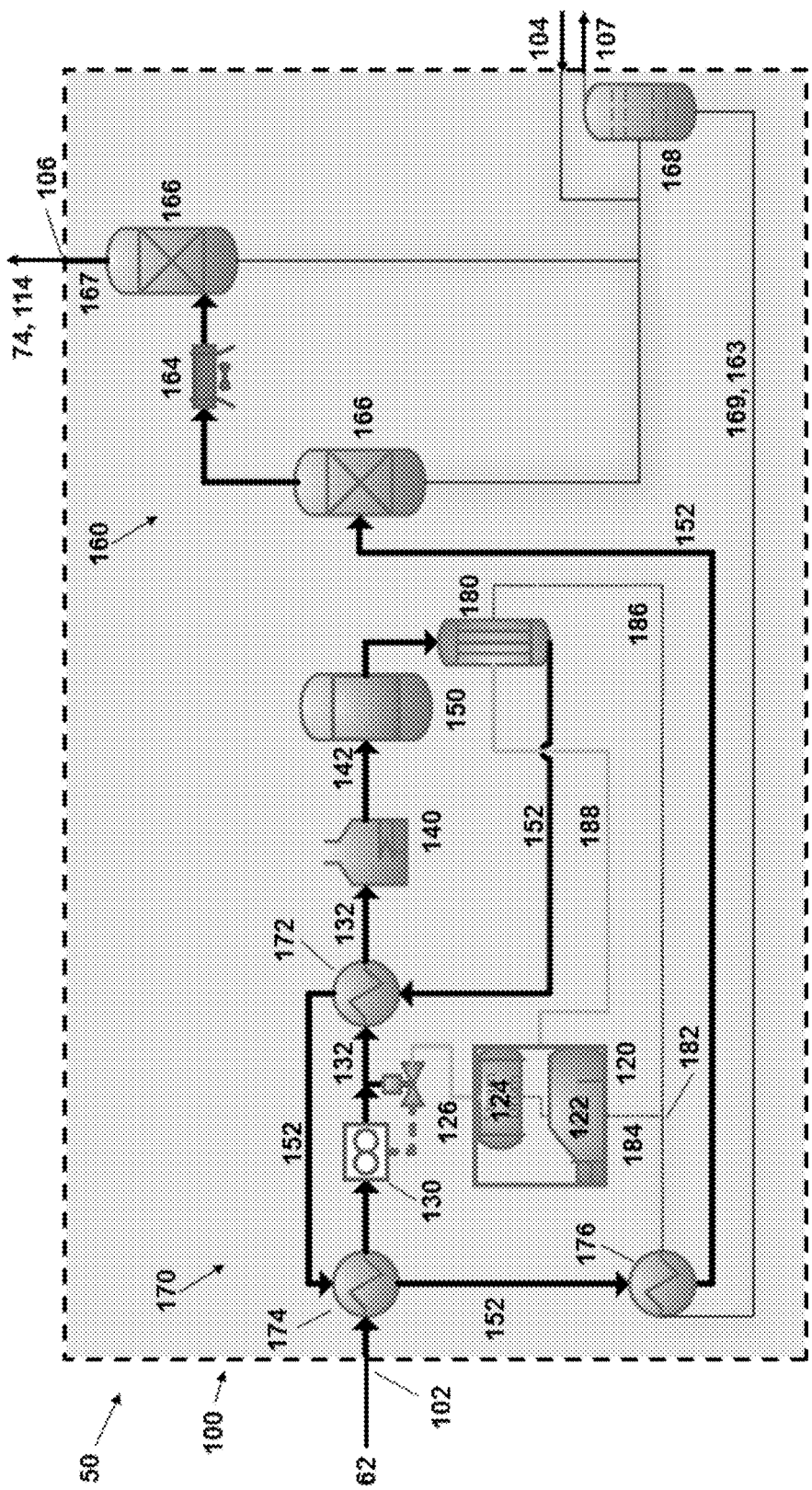
FIG. 12 is a process flow diagram illustrating representative unit operations and streams in an HHR module further including a vaporizer.

FIG. 12 illustrates an alternate embodiment of the HHR module 100 further including a vaporizer 180. The vaporizer 180 can be positioned downstream of the first reactor 150 and upstream of the recuperative heat exchangers 170 so that it can receive the hot wet reformate 152 as a hot heat exchange fluid to vaporize at least a portion of the system water 163 that would otherwise be returned to the steam generator 120 as illustrated in FIG. 11. As shown in FIG. 12, a portion 184 of the system water 163 is passed to the steam generator 120 as liquid water, for example to a boiler 122 component thereof. Similarly, a portion 186 of the system water 163 is passed to the vaporizer 180 as a cold heat exchange fluid, whereupon it is vaporized by the hot reformate 152 and then passed to the steam generator 120 as steam, for example to a steam drum 124 component thereof.

Figure 13:
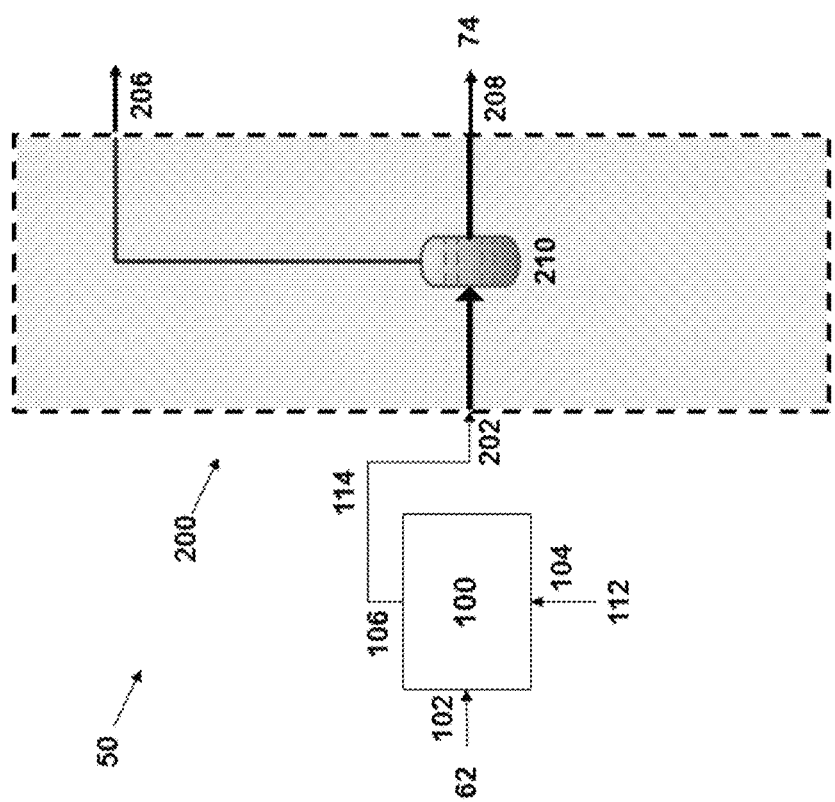
FIG. 13 is a process flow diagram illustrating representative unit operations and streams in the disclosed gas conversion system incorporating an HHR module and a carbon dioxide separator or module.

FIG. 13 illustrates a modular hydrocarbon or gas conversion system 50 including a carbon dioxide separator module 200 in series with an HHR module 100. The carbon dioxide separator module 200 can include a first (CO2) inlet 202 for a feed containing carbon dioxide, a first (CO2) outlet 206 for separated carbon dioxide, and a second (CO2) outlet 208 for an intermediate or final product gas with reduced carbon dioxide. As illustrated, the platform gas 114 from the HHR module 100 is fed to a carbon dioxide separator 210 in the module 200 via the first inlet 202. Example carbon dioxide separators 210 can include scrubbers (e.g., amine scrubbers), membrane separators, etc. A carbon dioxide-rich stream leaves the separator 210 and module 200 via the first outlet 206, for example as an additional carbon dioxide product stream 76, which can be subsequently used as a fuel diluent, added to an SNG feed as a source of carbon oxide reactant. A second stream containing reduces or substantially no carbon dioxide leaves the separator 210 and module 200 via the first outlet 208, for example as a product stream 74 containing both methane and hydrogen. In some embodiments, the product stream 74 can be used as a blue hydrogen-rich turbine fuel, which, similar to raw platform gas, can be blended with other fuel components such as C1 hydrocarbons or a mixture of hydrocarbons containing primarily C1 and C2, for example pipeline methane or otherwise a predominantly methane stream. In some embodiments, the methane/hydrogen mixture can be withdrawn as an intermediate product stream 212 and fed to other downstream modules (e.g., for hydrogen separation and/or SNG production).

Figure 14:
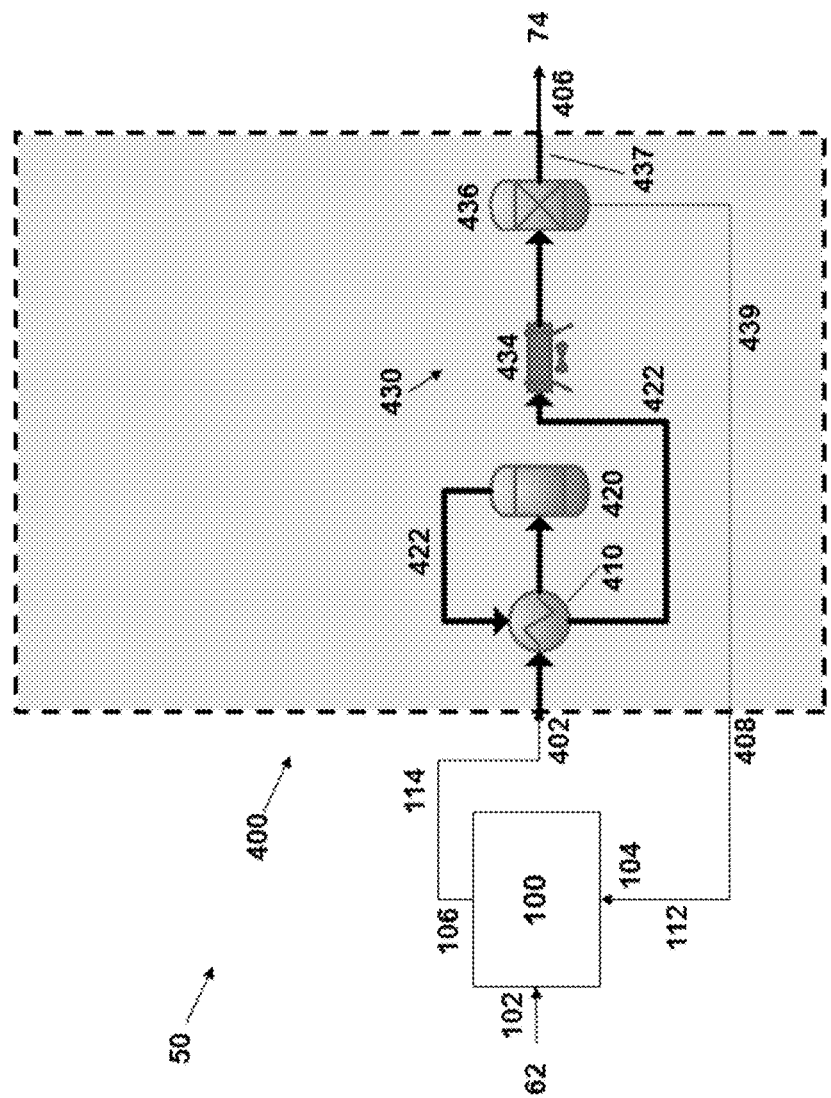
FIG. 14 is a process flow diagram illustrating representative unit operations and streams in the disclosed gas conversion system incorporating an HHR module and an SNG module.

FIG. 14 illustrates a modular hydrocarbon or gas conversion system 50 including an SNG module 400 in series with an HHR module 100. The SNG module 400 can include a first (SNG) inlet 402 for a feed containing hydrogen and carbon oxide, a first (SNG) outlet 406 for synthetic natural gas, and a second (SNG) outlet 408 for recycled system water. As illustrated, the platform gas 114 from the HHR module 100 is fed to a heater 410, for example a recuperative heat exchanger, in the module 400 via the first inlet 402. The platform gas 114 includes a mixture of hydrogen, carbon oxides, and methane and is heated to a selected temperature by the heater 410 before being fed to a second (SNG) reactor 420, which contains a catalyst adapted to react at least a portion of the carbon oxides and hydrogen to methane and water via methanation reactions. The product output of the second reactor 420 is a wet synthetic natural gas 422 including methane and water. More generally, any number of second reactors 420 can be used for example in parallel to increase capacity of the SNG module 400. The wet synthetic natural gas 422 exiting the second reactor 420 can be passed through a recuperative heat exchanger (for example the heater 410) then to a cooler or water separation unit 430 to remove water, which can be recycled, for example to the HHR module 100. In the embodiment shown in FIG. 14, the cooler 430 can include a chiller 434 to cool and condense water that can be removed from the wet gas in a water separator 436 to form a dried synthetic natural gas 437 with a substantially reduced water content. The dried synthetic natural gas 437 exits the SNG module 400 via the first outlet 406 as a product gas containing high levels of or substantially pure methane. The system water recovered from the water separator 436 can be fed back to the HHR module 100 via the second outlet 408 as further a recycled system water stream 112.

Figure 15:
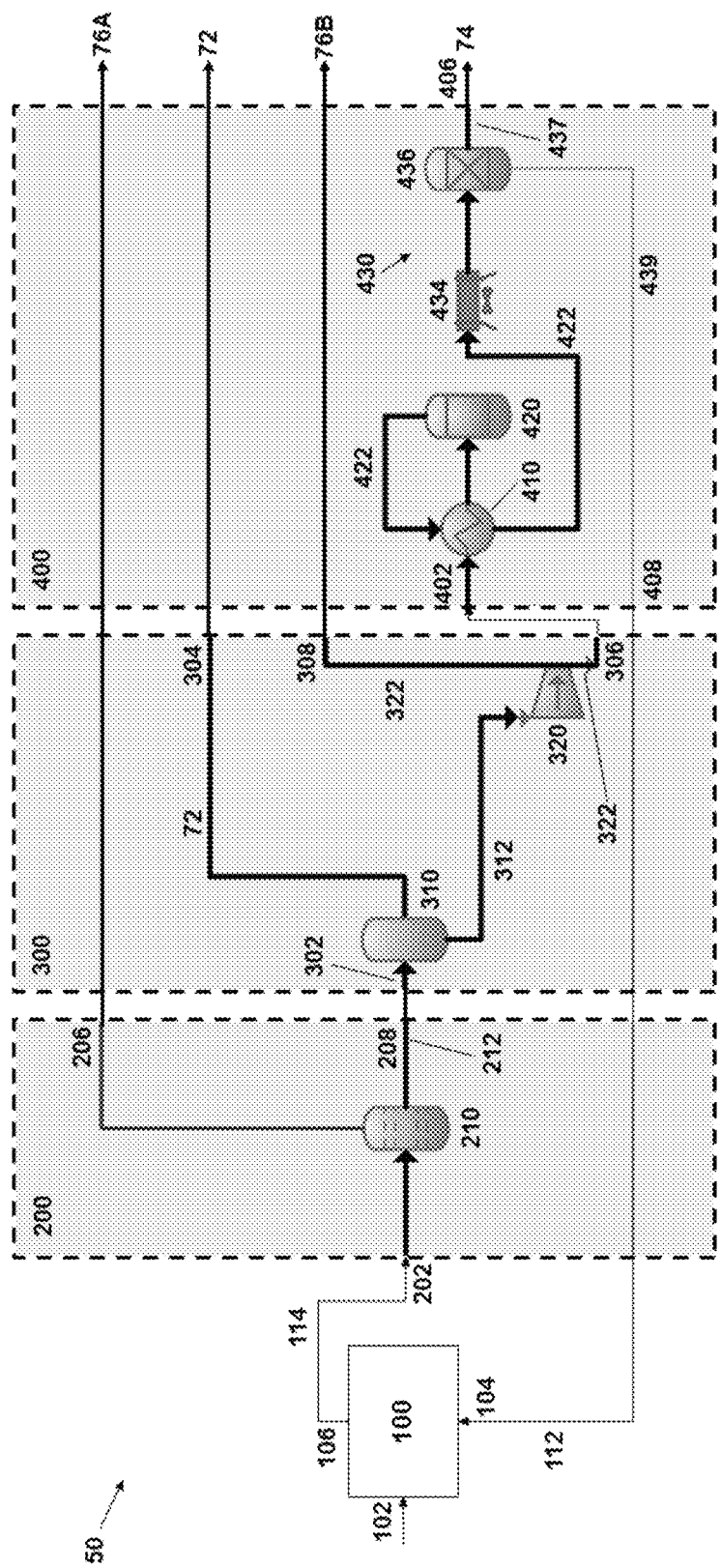
FIG. 15 is a process flow diagram illustrating representative unit operations and streams in the disclosed gas conversion system incorporating an HHR module, a carbon dioxide separator or module, a hydrogen separator module, and an SNG module.
Figure 16:
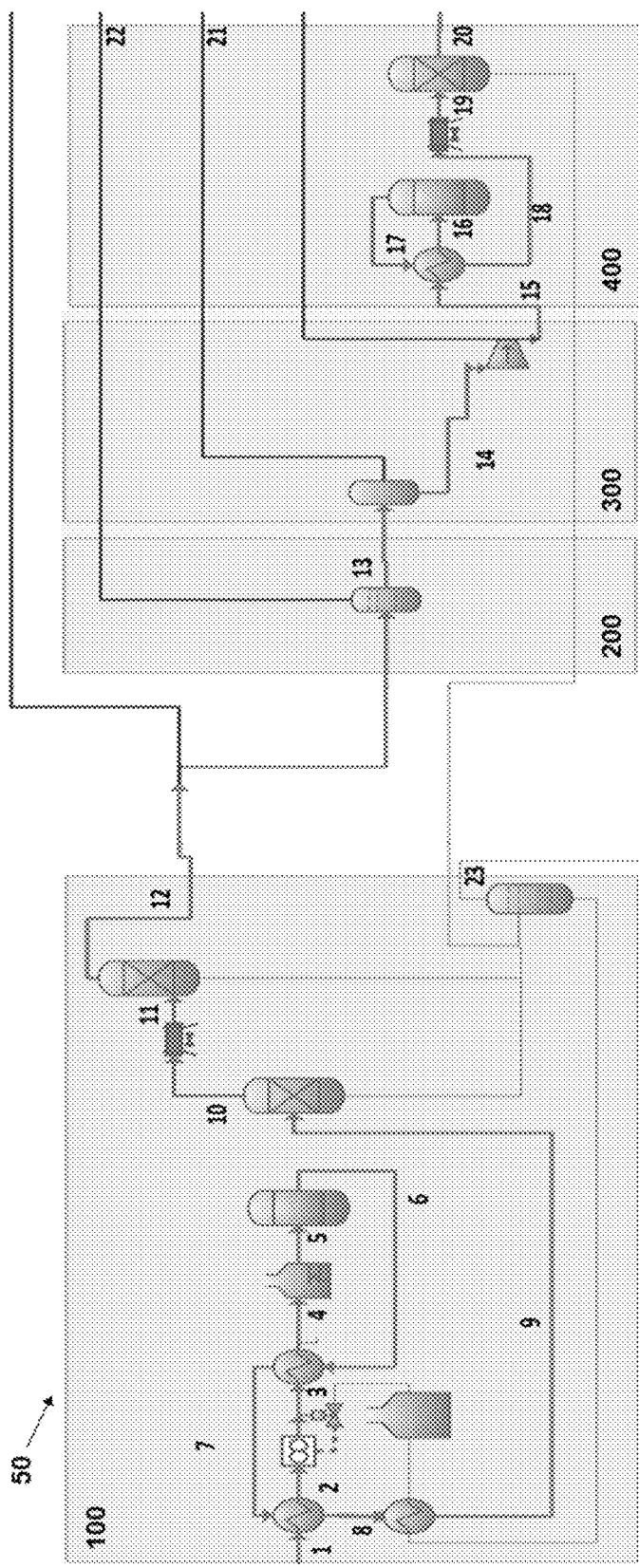
FIG. 16 is a process flow diagram illustrating specific streams in the gas conversion system of FIG. 15.

FIG. 15 illustrates a modular hydrocarbon or gas conversion system 50 including carbon dioxide separator module 200, a hydrogen separator module 300, and an SNG module 400 in series with an HHR module 100. The carbon dioxide separator module 200 and the SNG module 400 operate substantially as described above for the modular embodiments of FIG. 13 and FIG. 14, with the primary difference being that the hydrogen separator module 300 can withdraw high purity hydrogen as a product prior to passing a mixture of carbon oxides and hydrogen to the SNG module 400 to form a methane-rich product stream. The hydrogen separator module 300 can include a first (H2) inlet 302 for a feed containing hydrogen and carbon oxide, a first (H2) outlet 304 for high purity hydrogen gas, a second (H2) outlet 306 for compressed tail gas as an SNG feed, and a third (H2) outlet 308 for compressed tail gas as an alternative methane-containing product gas. As illustrated, the intermediate product gas 212 from the carbon dioxide separator module 200 is fed to a hydrogen separator 310 in the module 300 via the first inlet 302. Example hydrogen separators 310 can include PSA separators, membrane separators, etc. A hydrogen-rich stream leaves the separator 310 and module 300 via the first outlet 304, for example as a high purity hydrogen gas 72. Tail gas 312 exiting the hydrogen separator 310 is then compressed in a compressor 320 to provide a compressed tail gas 322 output. In some embodiments, a portion (or all) of the compressed tail gas 322 can be withdrawn via the third outlet 308 as an additional product stream 76B (e.g., as well as an additional product stream 76A containing primarily carbon dioxide). In some embodiments, a portion (or all) of the compressed tail gas 322 is fed via the second outlet 306 to the SNG module 400 as the SNG feed stream containing carbon oxides and hydrogen. In some embodiments, a portion of the carbon dioxide stream (or trim stream) from the upstream carbon dioxide separator 210 (e.g., via the first outlet 206 thereof) could be added to the tail gas 312 prior to compression such that the compressed tail gas 322 fed to the SNG module 400 contains additional carbon oxide reactants to promote higher conversion to methane in the SNG module 400.

In an alternative embodiment to that illustrated in FIG. 15, the SNG module 400 can be omitted. In such cases, two main products of the modular system 50 include the hydrogen gas stream 72 and the compressed tail gas stream 76B.

In another alternative embodiment to that illustrated in FIG. 15, the modular system can include a bypass line such that a portion (or all) of the platform gas 114 can be fed directly to the SNG module 400, thus bypassing the carbon dioxide separator module 200 and the hydrogen separator module 300. For example, a suitable flow splitter on the platform gas 114 line upstream of the carbon dioxide separator module 200 permits partitioning of the platform gas 114 such that the system 50 can operate as illustrated in FIG. 14 (i.e., methane as primary product), FIG. 15 (i.e., hydrogen and methane as primary products), or a user-desired combination of the two embodiments.

EXAMPLES

The following examples include process simulations providing illustrative compositions and stream conditions for hydrocarbon conversion systems according to the disclosure.

Example 1

Table 5 below provides illustrative composition values for a process as generally illustrated in FIG. 8 incorporating a raw flare/associated gas bypass stream for enrichment of the product stream. The inlet feed gas is representative of a typical flare gas, containing about 60-65 mol. % methane, about 30-35 mol. % ethane and propane combined, and about 1-5 mol. % of heavier hydrocarbons (C4+). The "process gas" and "product gas" columns include the fraction of hydrogen gas formed in the system, which is about 10-50 mol. % or 20-25 mol. % based on the throughput of the gas conversion system or about 6-10 mol. % based on the overall feed gas (i.e., bypass amount plus gas conversion system throughput amount combined). In an embodiment in which the hydrogen component is separated from the output of the gas conversion system, the hydrogen amounts in the "process gas" column is recovered in a substantially pure hydrogen stream, and the concentrations of the other components are correspondingly increased proportionally (e.g., based on hydrogen separation as well as possible carbon dioxide separation as well).

TABLE 5

Illustrative Process Stream Components for Hydrogen Generation with Enrichment

| Component | Flare Feed Gas (mol. %) | Process Gas (mol. %) | Product Gas (mol. %) |
| --- | --- | --- | --- |
| CH4 | 62.77 | 63.08 | 62.87 |
| C2 | 20.45 | — | 14.04 |
| C3 | 11.53 | — | 7.92 |
| iC4 | 1.13 | — | 0.78 |
| nC4 | 1.75 | — | 1.20 |
| iC5 | 0.20 | — | 0.14 |
| nC5 | 0.13 | — | 0.09 |
| C6+ | 0.12 | — | 0.08 |
| H2 | — | 23.39 | 7.32 |
| CO2 | 1.54 | 13.33 | 5.23 |
| N2 | 0.39 | 0.19 | 0.33 |

Example 2

Similar to Example 1, Table 6 below provides illustrative composition values for a process as generally illustrated in FIG. 10 incorporating both a raw flare/associated gas bypass stream for enrichment of the product stream as well as both hydrogen separation and carbon dioxide separation for two additional product streams.

TABLE 6

Illustrative Process Stream Components for Hydrogen and Carbon Dioxide Generation with Enrichment

| Component | Feed Gas (mol. %) | H2 Gas (kg/day) | CO2 Gas (kg/day) | Product Gas 3 (mol. %) |
| --- | --- | --- | --- | --- |
| CH4 | 60.00 | | | 67.54 |
| C2 | 14.76 | | | 11.43 |
| C3 | 10.19 | | | 6.42 |
| iC4 | 1.02 | | | 0.45 |
| nC4 | 3.54 | | | 1.28 |
| iC5 | 0.81 | | | 0.16 |
| nC5 | 0.94 | | | 0.19 |
| C6+ | 2.93 | | | 0..41 |
| H2 | — | 1151 | | 6.59 |
| CO2 | 0.32 | | 13159 | 0.99 |
| N2 | 5.48 | | | 4.50 |
| MeOH | | | | 0.05 |

Examples 3-6

Examples 3-6 illustrate the ability of an HHR module according to the disclosure to provide a controllable, variable-composition platform gas using the same installed configuration of process equipment, but with a varied inlet steam:carbon ratio and temperature for the first (HHR) reactor. The HHR module is as illustrated in FIG. 11, and the hydrocarbon gas feed is pure ethane. Tables 7-10 below provide stream conditions for superheated inlet to the first (HHR) reactor, wet reformate outlet from the first (HHR) reactor, and dry reformate platform gas of the HHR module (i.e., streams 142, 152, and 167, respectively, in FIG. 11).

TABLE 7

Example 3 Stream Properties - Hydrogen Target Product, Lower Temperature

| Property | Superheated Feed | Wet Reformate | Platform Gas |
| --- | --- | --- | --- |
| T (° C.) | 455 | 566 | 49 |
| P (MPa) | 3.50 | 3.36 | 3.15 |
| Steam:Carbon | 4.08 | — | — |
| Total Molar Flow (kmol/hr) | 965.3 | 1083.3 | 363.4 |
| Methane (mol. %) | — | 13.41 | 39.92 |
| Ethane (mol. %) | 10.91 | — | — |
| Carbon Dioxide (mol. %) | — | 5.66 | 16.65 |
| Carbon Monoxide (mol. %) | — | 0.38 | 1.13 |
| Water (mol. %) | 89.09 | 66.49 | 0.42 |
| Hydrogen (mol. %) | — | 14.07 | 41.88 |

TABLE 8

Example 4 Stream Properties - Hydrogen Target Product, Higher Temperature

| Property | Superheated Feed | Wet Reformate | Platform Gas |
| --- | --- | --- | --- |
| T (° C.) | 475 | 700 | 49 |
| P (MPa) | 3.4 | 3.2 | 2.98 |
| Steam:Carbon | 4.02 | — | — |
| Total Molar Flow (kmol/hr) | 902.4 | 1118.5 | 506.0 |
| Methane (mol. %) | — | 8.18 | 18.2 |
| Ethane (mol. %) | 11.06 | — | — |
| Carbon Dioxide (mol. %) | — | 7.33 | 16.0 |
| Carbon Monoxide (mol. %) | — | 2.33 | 5.1 |

TABLE 8-continued

Example 4 Stream Properties - Hydrogen Target Product, Higher Temperature

| Property | Superheated Feed | Wet Reformate | Platform Gas |
|---|---|---|---|
| Water (mol. %) | 88.94 | 54.76 | 0.42 |
| Hydrogen (mol. %) | — | 27.40 | 60.3 |

TABLE 9

Example 5 Stream Properties - Methane Target Product, Lower Flow Rate

| Property | Superheated Feed | Wet Reformate | Platform Gas |
|---|---|---|---|
| T (° C.) | 500 | 473 | 49 |
| P (MPa) | 3.4 | 3.2 | 2.98 |
| Steam:Carbon | 2.3 | — | — |
| Total Molar Flow (kmol/hr) | 396.0 | 988.8 | 396.4 |
| Methane (mol. %) | — | 25.2 | 62.7 |
| Ethane (mol. %) | 17.78 | — | — |
| Carbon Dioxide (mol. %) | — | 6.0 | 14.7 |
| Carbon Monoxide (mol. %) | — | 0.2 | 0.4 |
| Water (mol. %) | 82.22 | 60 | 0.4 |
| Hydrogen (mol. %) | — | 8.7 | 21.7 |

TABLE 10

Example 6 Stream Properties - Methane Target Product, Higher Flow Rate

| Property | Superheated Feed | Wet Reformate | Platform Gas |
|---|---|---|---|
| T (° C.) | 500 | 473 | 49 |
| P (MPa) | 3.4 | 3.2 | 2.98 |
| Steam: Carbon | 2.3 | — | — |
| Total Molar Flow (kmol/hr) | 980.2 | 1106.5 | 427.8 |
| Methane (mol. %) | — | 25.8 | 66.8 |
| Ethane (mol. %) | 17.78 | — | — |
| Carbon Dioxide (mol. %) | — | 5.6 | 14.4 |
| Carbon Monoxide (mol. %) | — | 0.11 | 0.3 |
| Water (mol. %) | 82.22 | 61.5 | 0.4 |
| Hydrogen (mol. %) | — | 6.98 | 18.1 |

Example 7

Example 7 illustrates the ability of a hydrocarbon conversion system according to the disclosure to provide multiple, high purity product streams of hydrogen, methane, and carbon dioxide using a modular system design. The hydrocarbon conversion system includes an HHR module, carbon dioxide separator, hydrogen separator module, and SNG module as illustrated in FIGS. 11 and 15. The HHR module is operated as described above for a hydrogen main product at a high reactor temperature as described above for Example 4, and the hydrocarbon gas feed is pure ethane. Table 11 below provides stream conditions for the various process streams illustrated in FIG. 16.

TABLE 11

Example 7 Stream Properties

| Property | 1 | 2 | Steam | 3 | 4 | 5 | 6 | 7 | 8 |
|---|---|---|---|---|---|---|---|---|---|
| Total Molar Flow (kmol/hr) | 99.8 | 99.8 | 802.5 | 902.3 | 902.3 | 902.3 | 1118.5 | 1118.5 | 1118.5 |
| Methane (mol. %) | — | — | — | — | — | — | 8.18 | 8.18 | 8.18 |
| Ethane (mol. %) | 100 | 100 | — | 11.1 | 11.1 | 11.1 | — | — | — |
| Carbon Dioxide (mol. %) | — | — | — | — | — | — | 7.33 | 7.33 | 7.33 |
| Carbon Monoxide (mol. %) | — | — | — | — | — | — | 2.33 | 2.33 | 2.33 |
| Water (mol. %) | — | — | 100 | 88.9 | 88.9 | 88.9 | 54.8 | 54.8 | 54.8 |
| Hydrogen (mol. %) | — | — | — | — | — | — | 27.4 | 27.4 | 27.4 |

| Property | 9 | 10 | 11 | 12 | 13 | 14 | 15 | 16 | 17 |
|---|---|---|---|---|---|---|---|---|---|
| Total Molar Flow (kmol/hr) | 1118.5 | 1080.4 | 1080.4 | 507.2 | 424.6 | 186.1 | 185.2 | 185.2 | 138.8 |
| Methane (mol. %) | 8.18 | 8.47 | 8.47 | 18.0 | 21.5 | 49.0 | 49.2 | 49.2 | 82.4 |
| Ethane (mol. %) | — | — | — | — | — | — | — | — | — |
| Carbon Dioxide (mol. %) | 7.33 | 7.59 | 7.59 | 14.0 | — | 0.01 | 0.01 | 0.01 | 2.04 |
| Carbon Monoxide (mol. %) | 2.33 | 2.41 | 2.41 | 5.14 | 6.13 | 14.0 | 14.1 | 14.1 | — |

TABLE 11-continued

| Example 7 Stream Properties | | | | | | | | |
|---|---|---|---|---|---|---|---|---|
| Water (mol. %) | 54.8 | 53.2 | 53.2 | 0.43 | 0.38 | 0.86 | 0.41 | 0.41 | 15.2 |
| Hydrogen (mol. %) | 27.4 | 28.4 | 28.4 | 60.2 | 72.0 | 36.2 | 36.3 | 36.3 | 0.34 |

| Property | 18 | 19 | 20 | 21 | 22 | 23 |
|---|---|---|---|---|---|---|
| Total Molar Flow (kmol/hr) | 138.8 | 138.8 | 118.2 | 238.5 | 88.31 | 1.12 |
| Methane (mol. %) | 82.4 | 82.4 | 96.7 | — | 0.09 | 6.24 |
| Ethane (mol. %) | — | — | — | — | — | — |
| Carbon Dioxide (mol. %) | 2.04 | 2.04 | 2.40 | — | 91.7 | 73.64 |
| Carbon Monoxide (mol. %) | — | — | — | — | — | 1.14 |
| Water (mol. %) | 15.2 | 15.2 | 0.47 | — | 8.18 | 4.57 |
| Hydrogen (mol. %) | 0.34 | 0.34 | 0.40 | 100 | 0.06 | 13.4 |

U.S. Publication No. 2019/0024003 is incorporated herein by reference in its entirety.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

FIGURE COMPONENTS LIST 50 hydrocarbon (or gas) conversion system
60 system feed stream(s)
62 hydrocarbon gas feed stream
64, 66 additional hydrocarbon feed or bypass/enrichment stream(s)
70 system product stream(s)
72 hydrogen gas stream
74 product gas stream
76 additional product stream(s)
80 methane separator
81 NGL separator
82 NGL run tank
90 auxiliary system(s)
100 heavy hydrocarbon reactor (HHR) module
102 first inlet (hydrocarbon feed)
104 second inlet (recycled water)
105 third inlet (makeup water)
106 first outlet (platform gas)
107 second outlet (deaerated reformate gas)
112 recycled system water
114 platform gas
120 steam generator
122 boiler
124 steam drum/reservoir
126 output steam
130 mixer
132 feed gas
134 additional flow mixer(s)
136 additional flow splitter(s)
140 super heater
142 superheated feed gas
150 first reactor or heavy hydrocarbon reactor (HHR)
152 first reformate
154 heating or heat exchange streams
160 cooler
162 collection or mixing point/water reservoir
163 system water
164 chiller
166 water separator
167 dried first reformate
168 de-aerator
169 recycled water stream
170 recuperative heat exchangers
172 first heat exchanger
174 second heat exchanger
176 third heat exchanger
180 vaporizer
182 flow splitter 184 recycled water to steam generator/boiler
186 recycled water to vaporizer or steam generator/reservoir
188 steam to steam generator (or steam drum)
200 carbon dioxide separator (002) module
202 first inlet
206 first outlet
208 second outlet
210 carbon dioxide separator
212 intermediate product stream
300 hydrogen separator (H2) module
302 first inlet
304 first outlet
306 second outlet
308 third outlet
310 hydrogen separator
312 tail gas
320 compressor
322 compressed tail gas
400 synthetic natural gas (SNG) module
402 first inlet
406 first outlet
408 second outlet
410 heater (or heat exchanger)
420 second reactor or synthetic natural gas (SNG) reactor
422 wet synthetic natural gas
430 cooler
434 chiller
436 water separator
437 dried synthetic natural gas
439 recycled water

What is claimed is:

1. A hydrocarbon conversion system for converting a hydrocarbon gas feed stream comprising non-methane hydrocarbons and optionally methane to form at least one of (i) a hydrogen gas stream and (ii) a product gas stream comprising methane, the hydrocarbon conversion system comprising:
    a heavy hydrocarbon reforming (HHR) module comprising:
        a first inlet for receiving the hydrocarbon gas feed stream;
        a second inlet for receiving system water;
        a first outlet for delivering a platform gas comprising methane and hydrogen;
        a steam generator adapted to (i) receive system water and (ii) output steam;
        a super heater adapted to (i) receive a feed gas comprising in admixture the hydrocarbon gas feed stream from the first inlet and the steam from the steam generator and (ii) superheat the feed gas to a predetermined temperature range to form a superheated feed gas;
        a first reactor containing a first catalyst and being adapted to receive the superheated feed gas from the super heater in fluid communication with the first reactor, wherein the first reactor and the first catalyst are adapted to react at least a portion of the non-methane hydrocarbons in the superheated feed gas into carbon oxides, hydrogen, methane, and water, thereby forming a first reformate comprising the carbon oxides, the hydrogen, the methane, and water; and
        a cooler adapted to (i) receive the first reformate from the first reactor in fluid communication with the cooler, and (ii) separate at least a portion of the water from the first reformate, thereby providing (i) a dried first reformate in fluid communication with the first outlet as the platform gas and (ii) a recycled system water stream in fluid communication with the steam generator and the second inlet;
    a carbon dioxide separator in fluid communication with the first outlet of the HHR module and adapted to (i) receive the platform gas from the HHR module and (ii) separate at least a portion of carbon dioxide present in the platform gas, thereby providing (i) a carbon dioxide stream and (ii) an intermediate product gas stream comprising the methane, the hydrogen, and unseparated carbon oxides from the platform gas;
    a hydrogen separator module comprising:
        a first inlet for receiving the intermediate product gas stream from and in fluid communication with the carbon dioxide separator;
        a first outlet for delivering the hydrogen gas stream; and
        a second outlet for delivering a compressed tail gas comprising hydrogen, carbon oxides, and methane;
        a hydrogen separator adapted to (i) receive the intermediate product gas and (ii) separate at least a portion of the hydrogen from the intermediate product gas, thereby providing (i) the hydrogen gas stream and (ii) a tail gas comprising hydrogen, carbon oxides, and methane; and
        a compressor adapted to receive and compress the tail gas; and
    a synthetic natural gas (SNG) module comprising:
        a first inlet for receiving an SNG feed stream comprising hydrogen, carbon oxides, and optionally methane, the first inlet of the SNG module being in fluid communication with the second outlet of the hydrogen separator module;
        a first outlet for delivering the product gas stream comprising the methane;
        a second outlet for delivering the recycled system water stream, the second outlet of the SNG module being in fluid communication with the second inlet of the HHR module;
        a heater adapted to (i) receive the SNG feed stream and (ii) heat the SNG feed stream to a predetermined temperature range to form a heated SNG feed gas;
        a second reactor (SNG) containing a second catalyst and being adapted to receive the heated SNG feed gas from the heater in fluid communication with the second reactor, wherein the second reactor and the second catalyst are adapted to react at least a portion of the carbon oxides and the hydrogen in the heated SNG feed gas into converted methane and water, thereby forming a wet synthetic natural gas comprising the converted methane and the water, wherein the wet synthetic natural gas has an overall higher methane mole fraction than the SNG feed stream; and
        a cooler adapted to (i) receive the wet synthetic natural gas from the second reactor in fluid communication with the cooler, and (ii) separate at least a portion of the water from the wet synthetic natural gas, thereby providing (i) a dried synthetic natural gas in fluid communication with the first outlet as the product gas and (ii) a recycled system water stream in fluid communication with the second outlet;
    wherein:
        the HHR module is adapted to control (i) a steam:carbon ratio in the superheated feed gas and (ii) a reaction temperature in the first reactor to select between (A) first operating conditions favoring methane production in the first reactor, in the resulting first reformate, and in the resulting platform gas, and (B) second operating conditions favoring hydrogen production in the first reactor, in the resulting first reformate, and in the resulting platform gas;

the steam:carbon ratio for the first operating conditions is in a range of 2 to 2.6, and the reaction temperature for the first operating conditions is characterized by an inlet temperature to the first reactor in a range of 400° C. to 550° C.; and the steam:carbon ratio for the second operating conditions is in a range of 3 to 8, and the reaction temperature for the second operating conditions is characterized by an inlet temperature to the first reactor in a range of 450° C. to 700° C.

2. The hydrocarbon conversion system of claim 1, further comprising:
a mixer in fluid communication with the first inlet for receiving the hydrocarbon gas feed stream and in fluid communication with the steam generator for receiving the output steam, the mixer being adapted to (i) control a flow rate of at least a portion of the hydrocarbon gas feed stream and the steam, and (ii) output the feed gas to the super heater in fluid communication with the mixer.

3. The hydrocarbon conversion system of claim 1, further comprising:
a vaporizer heat exchanger positioned between the first reactor and the cooler of the HHR module, the vaporizer heat exchanger being adapted to receive at least a portion of the system water as the vaporizer cold heat exchange fluid and the first reformate as the vaporizer hot heat exchange fluid, thereby heating and vaporizing the portion of the system water delivered as steam to the steam generator or downstream thereof.

4. The hydrocarbon conversion system of claim 1, further comprising:
a flow splitter adapted to (i) receive the system water, (ii) deliver at least a portion of the system water to a boiler portion of the steam generator, and (iii) deliver at least a portion of the system water to a steam reservoir portion of the steam generator.

5. The hydrocarbon conversion system of claim 1, wherein the cooler of the HHR module comprises:
(i) a chiller in fluid communication with and adapted to reduce the temperature of the first reformate from the first reactor, thereby condensing water from the first reformate;
(ii) a water separator in fluid communication with the chiller and adapted to remove the condensed water from the first reformate, thereby forming the platform gas and a reformate water stream as outlets from the water separator; and
(iii) a de-aerator in fluid communication with the reformate water stream from the water separator and adapted to remove entrained reformate gas therefrom, thereby forming the recycled system water stream.

6. The hydrocarbon conversion system of claim 1, wherein the HHR module is free from at least one of methane separators, hydrogen separators, carbon dioxide separators, and synthetic natural gas (SNG) reactors.

7. The hydrocarbon conversion system of claim 1, wherein the first reactor is adapted to operate as an adiabatic reactor, an isothermal reactor, a temperature increase-controlled reactor, or a temperature decrease-controlled reactor.

8. The hydrocarbon conversion system of claim 1, wherein the first reactor is adapted to receive a countercurrent or cocurrent heat exchange fluid, thereby providing heat to a reaction volume in the first reactor containing the first catalyst and the superheated feed gas.

9. The hydrocarbon conversion system of claim 1, further comprising:
a methane separator adapted to (i) receive a hydrocarbon gas pre-feed stream comprising non-methane hydrocarbons and methane and (ii) separate at least a portion of the methane from the pre-feed stream, thereby providing the hydrocarbon gas feed stream comprising the non-methane hydrocarbons as a feed to the first inlet.

10. The hydrocarbon conversion system of claim 1, wherein the HHR module contains only a single reactor containing a catalyst and being adapted to receive the superheated feed gas.

11. The hydrocarbon conversion system of claim 1, wherein the HHR module does not contain a water gas shift reactor.

12. A method for forming at least one of (i) a hydrogen gas stream and (ii) a product gas stream from a hydrocarbon gas feed stream comprising non-methane hydrocarbons and optionally methane, the method comprising:
feeding the hydrocarbon gas feed stream to a hydrocarbon conversion system according to claim 1, thereby forming at least one of (i) a hydrogen gas stream and (ii) a product gas stream; and
optionally adding an additional product stream to at least one of the hydrogen gas stream and the product gas stream, thereby forming a designer fuel stream having a selected composition.

13. The method of claim 12, wherein the non-methane hydrocarbons in the hydrocarbon gas feed stream are selected from C2 hydrocarbons, C3 hydrocarbons, C4 hydrocarbons, C5 hydrocarbons, C6 hydrocarbons, C1 alcohol oxygenated hydrocarbons, C2 alcohol oxygenated hydrocarbons, C3 alcohol oxygenated hydrocarbons, C4 alcohol oxygenated hydrocarbons, C5 alcohol oxygenated hydrocarbons, C6 alcohol oxygenated hydrocarbons, C7-C15 hydrocarbons, and combinations thereof.

14. The method of claim 12, wherein the hydrocarbon gas feed stream comprises methane.

15. The method of claim 12, wherein the hydrocarbon gas feed stream comprises ethanol and is substantially free from methane.

16. The method of claim 12, further comprising:
operating the first reactor under the first operating conditions favoring methane production or the second operating conditions favoring hydrogen production; and
subsequently operating the first reactor under the other of the first operating conditions favoring methane production or the second operating conditions favoring hydrogen production;
wherein:
the reaction temperature for the first operating conditions is characterized by an outlet temperature of the first reactor within 50° C. of the inlet temperature;
the reaction temperature for the second operating conditions is characterized by an outlet temperature of the first reactor that is 50° C. to 250° C. higher than the inlet temperatures; wherein,
when operating the first reactor under the first operating conditions, the platform gas has a methane content in a ramie of 50 mol. % to 80 mol. %, a hydrogen content in a range of 10 mol. % to 40 mol. %, and a carbon dioxide content in a ramie of 5 mol. % to 30 mol. %; and when operating the first reactor under the second operating conditions, the platform gas has a methane content up to 30 mol. %, a hydrogen content of at least 40 mol. %, and a carbon dioxide content in a range of 5 mol. % to 30 mol. %.

17. A hydrocarbon conversion system for converting a hydrocarbon gas feed stream comprising non-methane hydrocarbons and optionally methane to form at least one of (i) a hydrogen gas stream and (ii) a product gas stream comprising methane, the hydrocarbon conversion system comprising:
a heavy hydrocarbon reforming (HHR) module comprising:
a first inlet for receiving the hydrocarbon gas feed stream;
a second inlet for receiving system water;
a first outlet for delivering a platform gas comprising methane and hydrogen;
a steam generator adapted to (i) receive system water and (ii) output steam;
a super heater adapted to (i) receive a feed gas comprising in admixture the hydrocarbon gas feed stream from the first inlet and the steam from the steam generator and (ii) superheat the feed gas to a predetermined temperature range to form a superheated feed gas;
a first reactor containing a first catalyst and being adapted to receive the superheated feed gas from the super heater in fluid communication with the first reactor, wherein the first reactor and the first catalyst are adapted to react at least a portion of the non-methane hydrocarbons in the superheated feed gas into carbon oxides, hydrogen, methane, and water, thereby forming a first reformate comprising the carbon oxides, the hydrogen, the methane, and water; and
a cooler adapted to (i) receive the first reformate from the first reactor in fluid communication with the cooler, and (ii) separate at least a portion of the water from the first reformate, thereby providing (i) a dried first reformate in fluid communication with the first outlet as the platform gas and (ii) a recycled system water stream in fluid communication with the steam generator and the second inlet;
a first heat exchanger positioned between the steam generator and the super heater, the first heat exchanger being adapted to receive the feed gas comprising in admixture the hydrocarbon gas feed stream from the first inlet and the steam from the steam generator as a first cold heat exchange fluid and the first reformate as a first hot heat exchange fluid, thereby heating the feed gas delivered to the super heater;
a second heat exchanger positioned between the first inlet and the steam generator, the second heat exchanger being adapted to receive the hydrocarbon gas feed stream from the first inlet as a second cold heat exchange fluid and the first reformate as a second hot heat exchange fluid, thereby heating the hydrocarbon gas feed stream to be mixed with the steam to provide the feed gas; and
a third heat exchanger positioned between the cooler and the steam generator, the third heat exchanger being adapted to receive the recycled system water stream from the cooler and the system water from the second inlet as a third cold heat exchange fluid and the first reformate as a third hot heat exchange fluid, thereby heating the recycled system water stream in fluid communication with the steam generator and cooling the first reformate delivered to the cooler;
wherein:
the HHR module is adapted to control (i) a steam:carbon ratio in the superheated feed gas and (ii) a reaction temperature in the first reactor to select between (A) first operating conditions favoring methane production in the first reactor, in the resulting first reformate, and in the resulting platform gas, and (B) second operating conditions favoring hydrogen production in the first reactor, in the resulting first reformate, and in the resulting platform gas;
the steam:carbon ratio for the first operating conditions is in a range of 2 to 2.6, and the reaction temperature for the first operating conditions is characterized by an inlet temperature to the first reactor in a range of 400° C. to 550° C.; and
the steam:carbon ratio for the second operating conditions is in a range of 3 to 8, and the reaction temperature for the second operating conditions is characterized by an inlet temperature to the first reactor in a range of 450° C. to 700° C.

18. The hydrocarbon conversion system of claim 17, further comprising:
a vaporizer heat exchanger positioned between the first reactor and the first heat exchanger, the vaporizer heat exchanger being adapted to receive at least a portion of the system water as the vaporizer cold heat exchange fluid and the first reformate as the vaporizer hot heat exchange fluid, thereby heating and vaporizing the portion of the system water delivered as steam to the steam generator or downstream thereof.

19. The hydrocarbon conversion system of claim 18, further comprising:
a flow splitter adapted to (i) receive the system water, (ii) deliver at least a portion of the system water to the steam generator, and (iii) deliver at least a portion of the system water to the vaporizer heat exchanger.

20. The hydrocarbon conversion system of claim 17, wherein:
the hydrocarbon conversion system is free from further separation or reaction apparatus downstream of the HHR module first outlet; and
the platform gas is the product gas stream.

21. The hydrocarbon conversion system of claim 17, further comprising:
a carbon dioxide separator in fluid communication with the first outlet of the HHR module and adapted to (i) receive the platform gas from the HHR module and (ii) separate at least a portion of carbon dioxide present in the platform gas, thereby providing (i) a carbon dioxide stream and (ii) the product gas stream comprising the methane and the hydrogen from the platform gas.

22. The hydrocarbon conversion system of claim 17, further comprising:
a synthetic natural gas (SNG) module comprising:
a first inlet for receiving an SNG feed stream comprising hydrogen, carbon oxides, and optionally methane, the first inlet of the SNG module being in fluid communication with the first outlet of the HHR module;
a first outlet for delivering the product gas stream comprising the methane;
a second outlet for delivering the recycled system water stream, the second outlet of the SNG module being in fluid communication with the second inlet of the HHR module;

a heater adapted to (i) receive the SNG feed stream and (ii) heat the SNG feed stream to a predetermined temperature range to form a heated SNG feed gas;

a second reactor (SNG) containing a second catalyst and being adapted to receive the heated SNG feed gas from the heater in fluid communication with the second reactor, wherein the second reactor and the second catalyst are adapted to react at least a portion of the carbon oxides and the hydrogen in the heated SNG feed gas into converted methane and water, thereby forming a wet synthetic natural gas comprising the converted methane and the water, wherein the wet synthetic natural gas has an overall higher methane mole fraction than the SNG feed stream; and a cooler adapted to (i) receive the wet synthetic natural gas from the second reactor in fluid communication with the cooler, and (ii) separate at least a portion of the water from the wet synthetic natural gas, thereby providing (i) a dried synthetic natural gas in fluid communication with the first outlet as the product gas and (ii) a recycled system water stream in fluid communication with the second outlet.

23. The hydrocarbon conversion system of claim 17, further comprising:

a carbon dioxide separator in fluid communication with the first outlet of the HHR module and adapted to (i) receive the platform gas from the HHR module and (ii) separate at least a portion of carbon dioxide present in the platform gas, thereby providing (i) a carbon dioxide stream and (ii) an intermediate product gas stream comprising the methane, the hydrogen, and unseparated carbon oxides from the platform gas; and a hydrogen separator module comprising:
  a first inlet for receiving the intermediate product gas stream from and in fluid communication with the carbon dioxide separator;
  a first outlet for delivering the hydrogen gas stream; and
  a second outlet for delivering a compressed tail gas comprising hydrogen, carbon oxides, and methane;
  a hydrogen separator adapted to (i) receive the intermediate product gas and (ii) separate at least a portion of the hydrogen from the intermediate product gas, thereby providing (i) the hydrogen gas stream and (ii) a tail gas comprising hydrogen, carbon oxides, and methane; and
  a compressor adapted to receive and compress the tail gas, thereby providing the compressed tail gas as the product gas.

24. The hydrocarbon conversion system of claim 17, further comprising:

a carbon dioxide separator in fluid communication with the first outlet of the HHR module and adapted to (i) receive the platform gas from the HHR module and (ii) separate at least a portion of carbon dioxide present in the platform gas, thereby providing (i) a carbon dioxide stream and (ii) an intermediate product gas stream comprising the methane, the hydrogen, and unseparated carbon oxides from the platform gas; and a hydrogen separator module comprising:
  a first inlet for receiving the intermediate product gas stream from and in fluid communication with the carbon dioxide separator;
  a first outlet for delivering the hydrogen gas stream; and
  a second outlet for delivering a compressed tail gas comprising hydrogen, carbon oxides, and methane;
  a hydrogen separator adapted to (i) receive the intermediate product gas and (ii) separate at least a portion of the hydrogen from the intermediate product gas, thereby providing (i) the hydrogen gas stream and (ii) a tail gas comprising hydrogen, carbon oxides, and methane; and
  a compressor adapted to receive and compress the tail gas; and a synthetic natural gas (SNG) module comprising:
  a first inlet for receiving an SNG feed stream comprising hydrogen, carbon oxides, and optionally methane, the first inlet of the SNG module being in fluid communication with the second outlet of the hydrogen separator module;
  a first outlet for delivering the product gas stream comprising the methane;
  a second outlet for delivering the recycled system water stream, the second outlet of the SNG module being in fluid communication with the second inlet of the HHR module;
  a heater adapted to (i) receive the SNG feed stream and (ii) heat the SNG feed stream to a predetermined temperature range to form a heated SNG feed gas;
  a second reactor (SNG) containing a second catalyst and being adapted to receive the heated SNG feed gas from the heater in fluid communication with the second reactor, wherein the second reactor and the second catalyst are adapted to react at least a portion of the carbon oxides and the hydrogen in the heated SNG feed gas into converted methane and water, thereby forming a wet synthetic natural gas comprising the converted methane and the water, wherein the wet synthetic natural gas has an overall higher methane mole fraction than the SNG feed stream; and
  a cooler adapted to (i) receive the wet synthetic natural gas from the second reactor in fluid communication with the cooler, and (ii) separate at least a portion of the water from the wet synthetic natural gas, thereby providing (i) a dried synthetic natural gas in fluid communication with the first outlet as the product gas and (ii) a recycled system water stream in fluid communication with the second outlet.

\* \* \* \* \*